US012673384B2

(12) United States Patent
Hatano et al.

(10) Patent No.: US 12,673,384 B2
(45) Date of Patent: Jul. 7, 2026

(54) LASER PROCESSOR, LASER PROCESSING SYSTEM, AND METHOD FOR MOUNTING CARTRIDGE

(71) Applicant: Yamazaki Mazak Corporation, Niwa-gun (JP)

(72) Inventors: Kazuhiro Hatano, Niwa-gun (JP); Tetsuichi Kitamoto, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 785 days.

(21) Appl. No.: 18/085,572

(22) Filed: Dec. 21, 2022

(65) Prior Publication Data

US 2023/0121429 A1 Apr. 20, 2023

Related U.S. Application Data

(63) Continuation of application No. PCT/JP2020/025066, filed on Jun. 25, 2020.

(51) Int. Cl.
*B23K 26/064* (2014.01)
*B23K 26/38* (2014.01)
*B23K 37/02* (2006.01)

(52) U.S. Cl.
CPC .......... *B23K 26/0648* (2013.01); *B23K 26/38* (2013.01); *B23K 37/0241* (2013.01)

(58) Field of Classification Search
CPC .............. B23K 26/142; B23K 37/0241; B23K 26/0648; B23K 26/064; B23K 26/38
See application file for complete search history.

(56) References Cited

U.S. PATENT DOCUMENTS

2007/0012669 A1 1/2007 Mori et al.
2020/0276671 A1 9/2020 Tanaka et al.

FOREIGN PATENT DOCUMENTS

CN 1895833 1/2007
CN 201061845 Y 5/2008
CN 103551740 2/2014
CN 203484804 U 3/2014
(Continued)

OTHER PUBLICATIONS

Chinese Office Action for corresponding CN Application No. 202080102273.0, Nov. 30, 2023.
(Continued)

*Primary Examiner* — Thien S Tran
(74) *Attorney, Agent, or Firm* — MORI & WARD, LLP

(57) ABSTRACT

A laser processor includes a machining head and a cartridge configured to be inserted in the machining head. The machining head includes an optical path of a laser beam, a pressing member, and a stopper surface. The cartridge is configured to be pressed along the optical path toward the stopper surface by the pressing member when the cartridge is in the machining head. The cartridge includes an optical component configured to be positioned in the optical path when the cartridge is in the machining head. The optical component has a first surface and a second surface opposite to the first surface along the optical path, a first member configured to contact the first surface of the optical component and the pressing member, and a second member configured to contact the second surface of the optical component and the stopper surface.

18 Claims, 17 Drawing Sheets

(56) References Cited

FOREIGN PATENT DOCUMENTS

| CN | 104325223 | | 2/2015 | |
|----|-----------|---|--------|---|
| CN | 204867829 | U | 12/2015 | |
| CN | 206520887 | U | 9/2017 | |
| CN | 206732386 | U * | 12/2017 | |
| CN | 110392619 | | 10/2019 | |
| CN | 210413109 | U * | 4/2020 | |
| DE | 3814074 | | 11/1989 | |
| JP | 6663543 | B1 * | 3/2020 | .......... B23K 26/064 |

OTHER PUBLICATIONS

Chinese Office Action for corresponding CN Application No. 202080102273.0, Mar. 15, 2024.
International Search Report for corresponding International Application No. PCT/JP2020/025066, Aug. 25, 2020.
Written Opinion for corresponding International Application No. No. PCT/JP2020/025066, Aug. 25, 2020.
Japanese Office Action for corresponding JP Application No. 2020-552051, Nov. 17, 2020 (w/ English machine translation).
Chinese Office Action for corresponding CN Application No. 202080102273.0, Jun. 14, 2023.
Supplementary European Search Report for corresponding EP Application No. 20942094.2-1103, Jun. 27, 2023.
EP Office Action for corresponding EP Application No. 20942094.2-1103, Jul. 7, 2023.

* cited by examiner

ST1 — Prepare cartridge 6 in which optical component 60 is disposed between first member 70 and second member 80

ST2 — Insert cartridge 6 in machining head 2

ST3 — Move pressing member 30 toward first member 70, and pressing member 30 presses first member 70

ST4 — Machining head 2 radiates laser beam

LASER PROCESSOR, LASER PROCESSING SYSTEM, AND METHOD FOR MOUNTING CARTRIDGE

CROSS-REFERENCE TO RELATED APPLICATIONS

The present application is a continuation application of International Application No. PCT/JP2020/025066, filed Jun. 25, 2020. The contents of this application are incorporated herein by reference in their entirety.

BACKGROUND OF THE INVENTION

Field of the Invention

The present invention relates to a laser processor, a laser processing system, and a method for mounting a cartridge.

Discussion of the Background

A technique for mounting a cartridge on a laser processor is known.

JP6663543B discloses a laser processor as a related technique. The laser processor disclosed in JP6663543B includes a cartridge that includes a first optical element, a housing having a cartridge hole that receives the cartridge, and a switching mechanism that urges and releases the cartridge relative to the housing.

SUMMARY OF THE INVENTION

According to one aspect of the present invention, a laser processor includes a machining head and a cartridge configured to be inserted in the machining head. The machining head includes an optical path of a laser beam, a pressing member, and a stopper surface. The cartridge is configured to be pressed along the optical path toward the stopper surface by the pressing member when the cartridge is in the machining head. The cartridge includes an optical component configured to be positioned in the optical path when the cartridge is in the machining head. The optical component has a first surface and a second surface opposite to the first surface along the optical path, a first member configured to contact the first surface of the optical component and the pressing member, and a second member configured to contact the second surface of the optical component and the stopper surface.

According to another aspect of the present invention, a laser processing system includes a workpiece support configured to support a workpiece to be processed by a laser beam, a drive device, a controller configured to control the drive device, and a laser processor. The laser processor includes a machining head configured to radiate the laser beam toward the workpiece and configured to be moved by the drive device relative to the workpiece support; a laser source; an optical transmission member configured to transmit the laser beam from the laser source to the machining head; the machining head having an optical path of the laser beam; and a cartridge configured to be inserted in the machining head. The machining head includes a pressing member and a stopper surface. The cartridge is configured to be pressed by the pressing member when the cartridge is in the machining head, the cartridge includes an optical component disposed on the optical path when the cartridge is in the machining head, and the optical component has a first surface and a second surface opposite to the first surface along the optical path; a first member configured to contact the first surface of the optical component and the pressing member; and a second member configured to contact the second surface of the optical component and the stopper surface.

According to further aspect of the present invention, a method for mounting a cartridge on a laser processor having a machining head includes providing the cartridge which includes a first member, a second member, and an optical component which has a first surface and a second surface opposite to the first surface and which is provided between the first member and the second member such that the first surface and a second surface face the first member and the second member, respectively; inserting the cartridge in the machining head having an optical path of a laser beam such that the optical component is positioned in the optical path; and pressing the first member toward a stopper surface of the machining head so that the first member presses the first surface of the optical component toward the stopper surface and so that the second surface of the optical component presses the second member to the stopper surface.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
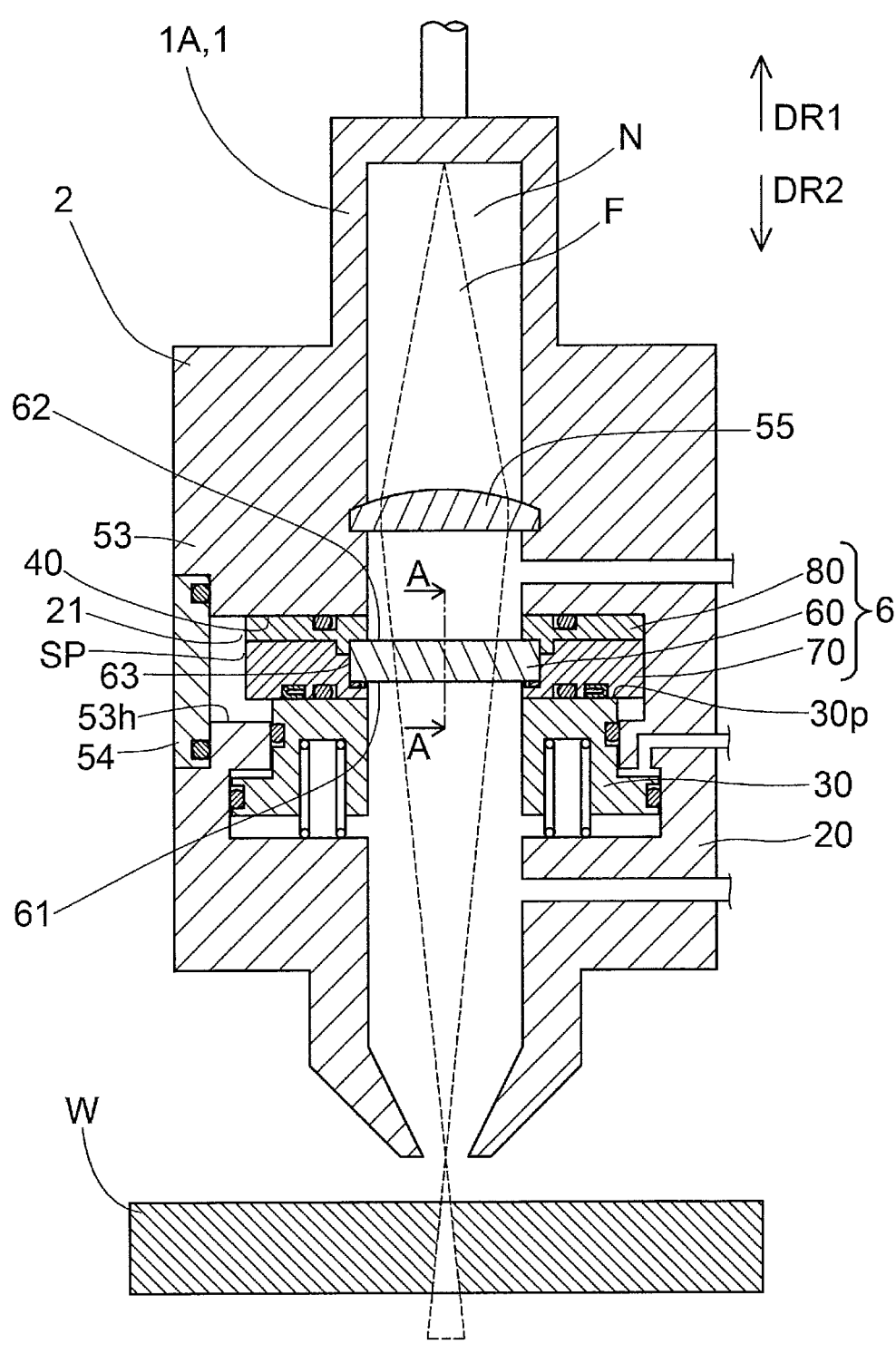
FIG. 1 is a schematic cross-sectional view of part of a laser processor according to a first embodiment.

A laser processor 1, a laser processing system 100, and a method for mounting a cartridge 6 according to some embodiments will be described with reference to the drawings. In the following descriptions of the embodiments, identical reference numerals are given to sections and members having identical functions, and descriptions of the sections and members with the identical reference numerals that are deemed redundant will be omitted.

First Embodiment

Figure 2:
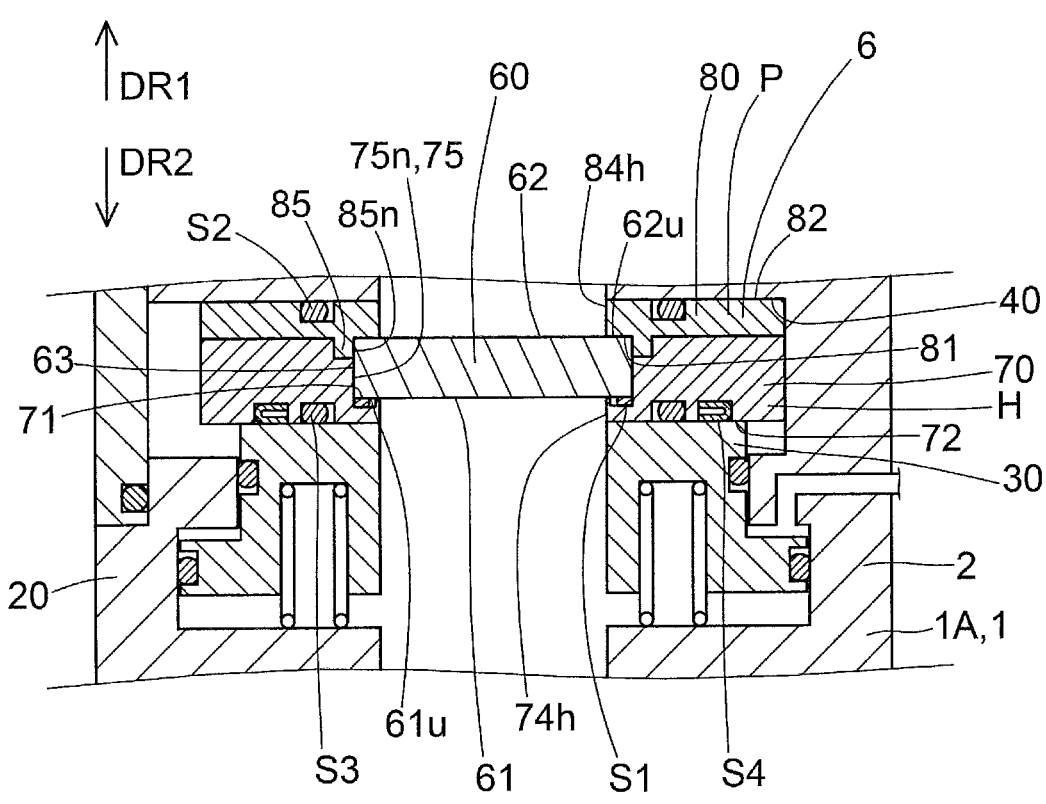
FIG. 2 is an enlarged schematic cross-sectional view of part of FIG. 1.
Figure 3:
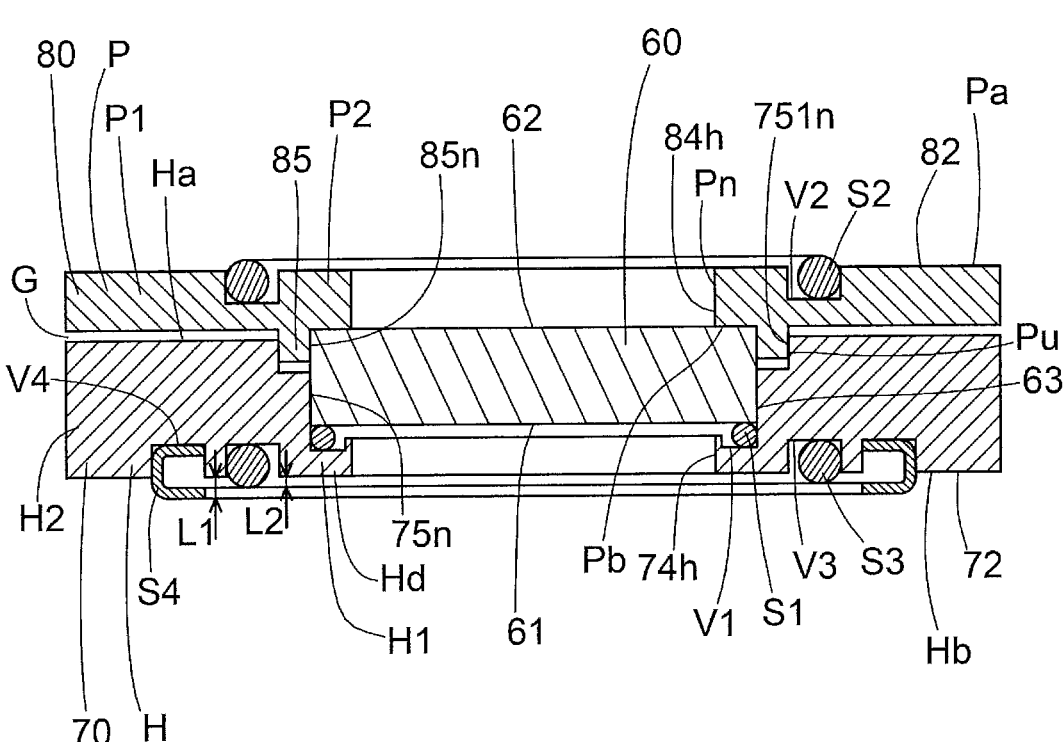
FIG. 3 is a schematic cross-sectional view of a cartridge to be inserted in a machining head.
Figure 4:
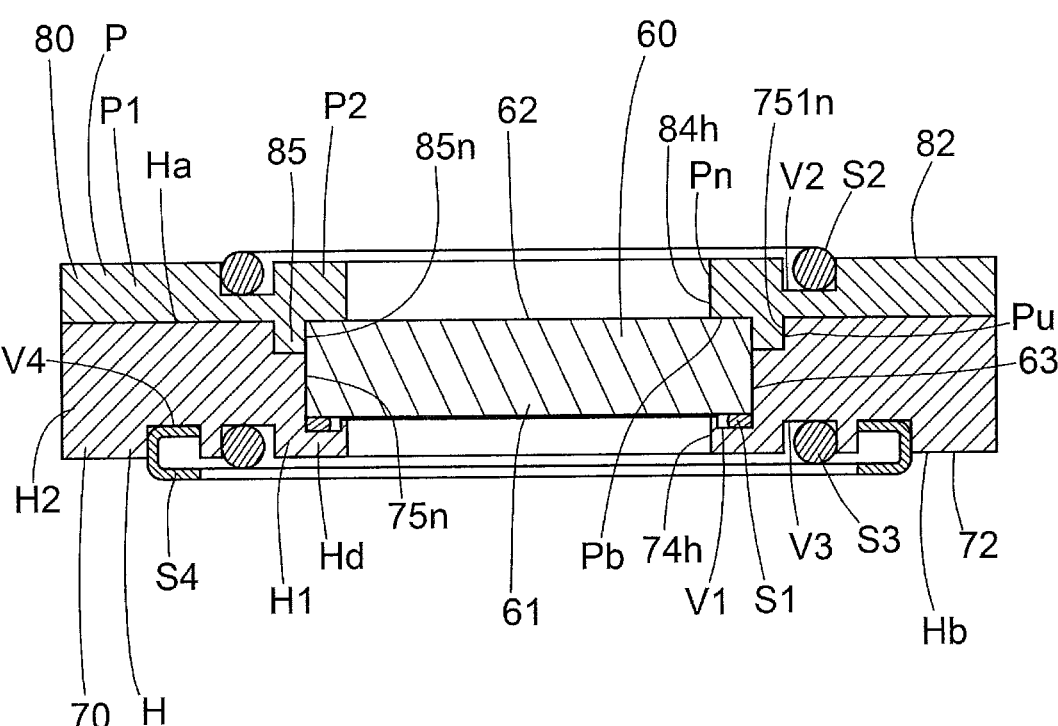
FIG. 4 is a schematic cross-sectional view of the cartridge to be inserted in the machining head.
Figure 5:
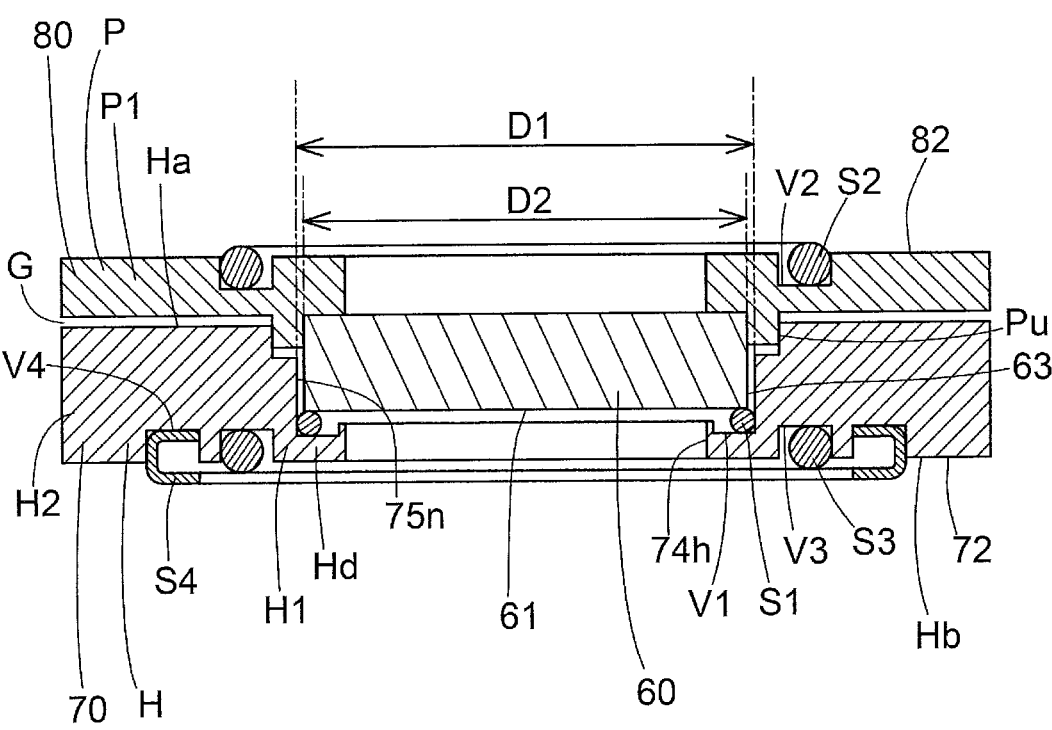
FIG. 5 is a schematic cross-sectional view of a cartridge according to a first modification to be inserted in the machining head.
Figure 6:
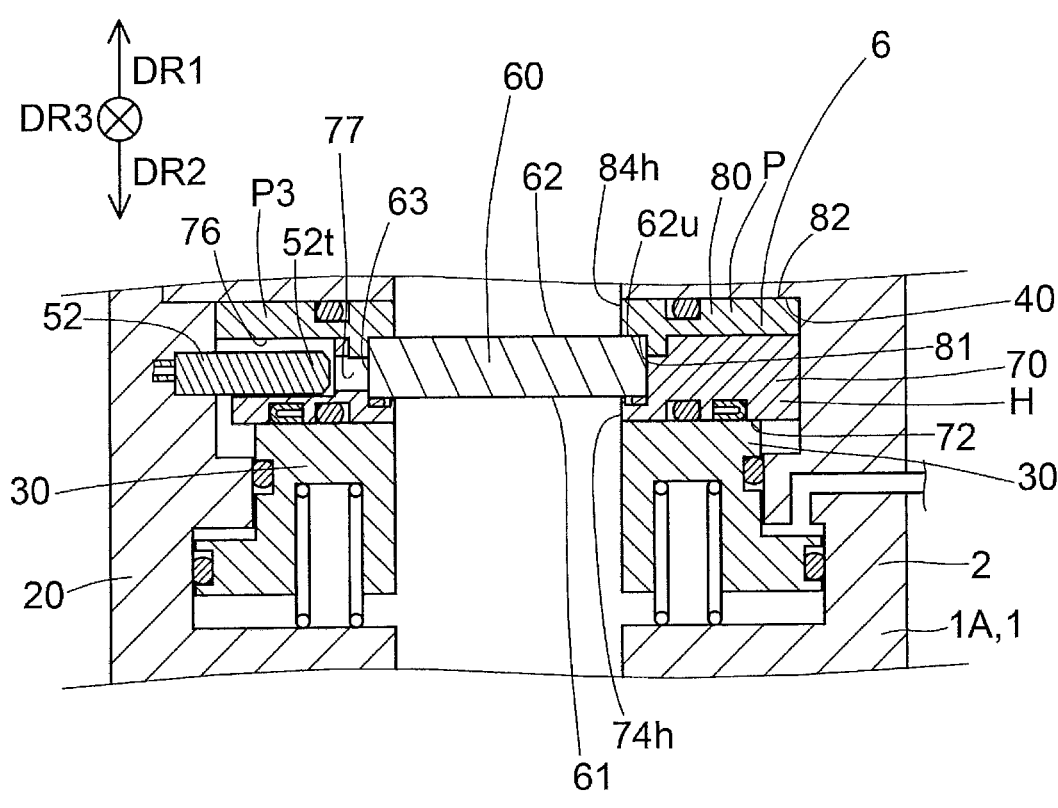
FIG. 6 is a cross-sectional view taken along line A-A of FIG. 1 as viewed in the direction of arrows.
Figure 7:
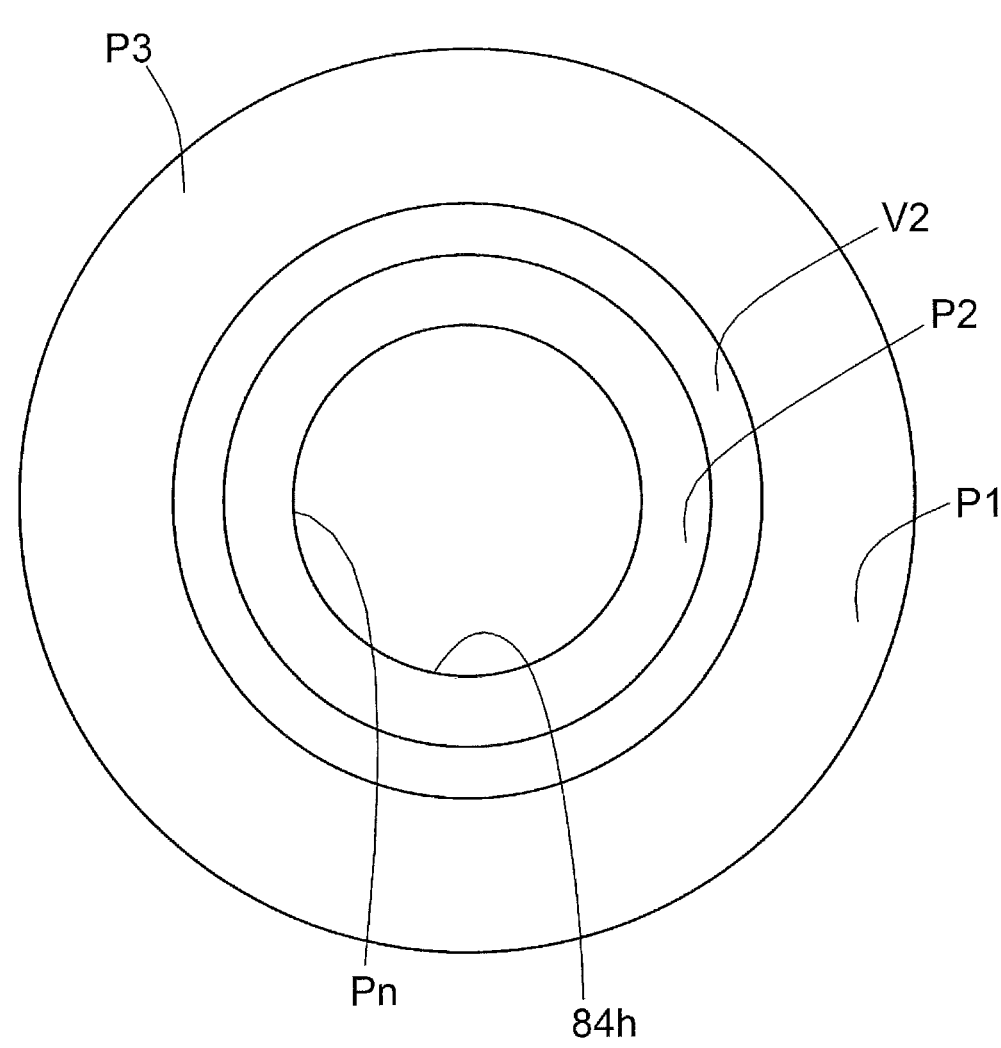
FIG. 7 is a schematic plan view of a pressing ring.
Figure 8:
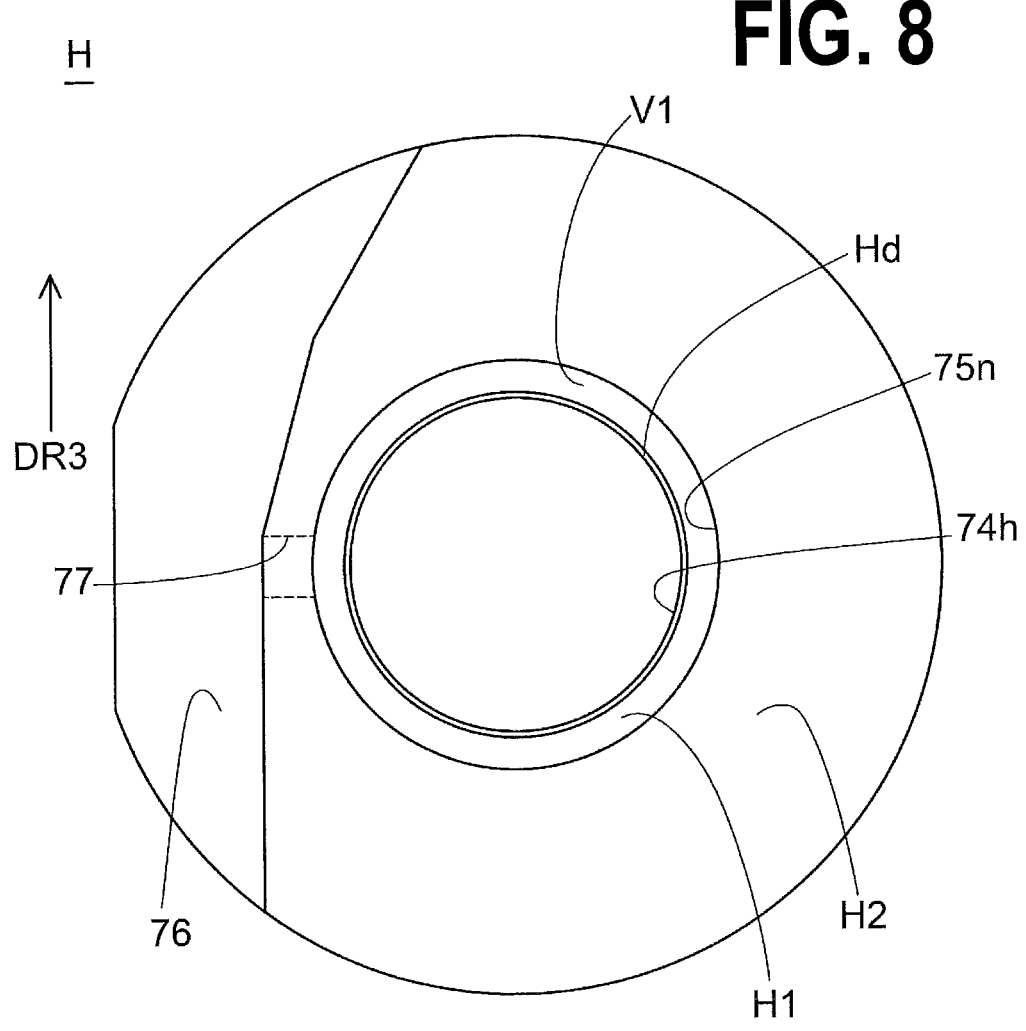
FIG. 8 is a schematic plan view of a housing.
Figure 9:
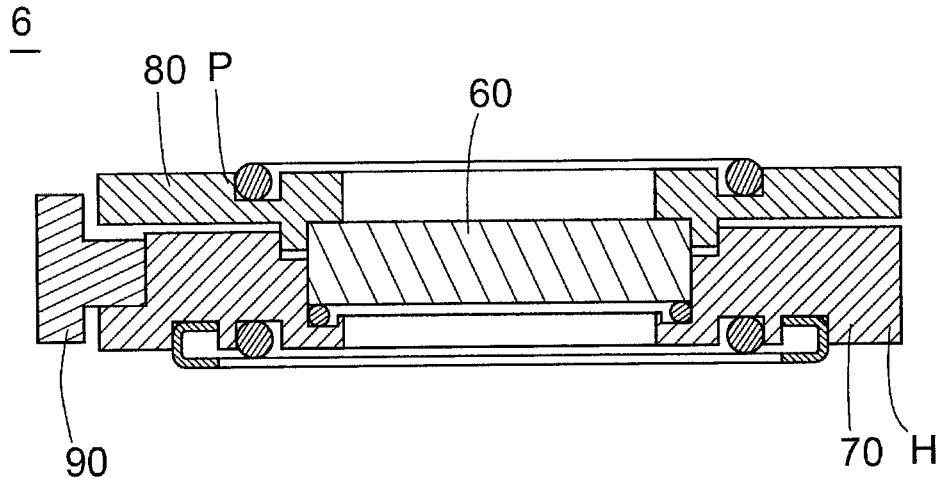
FIG. 9 is a schematic cross-sectional view of a cartridge according to a second modification to be inserted in the machining head.
Figure 10:
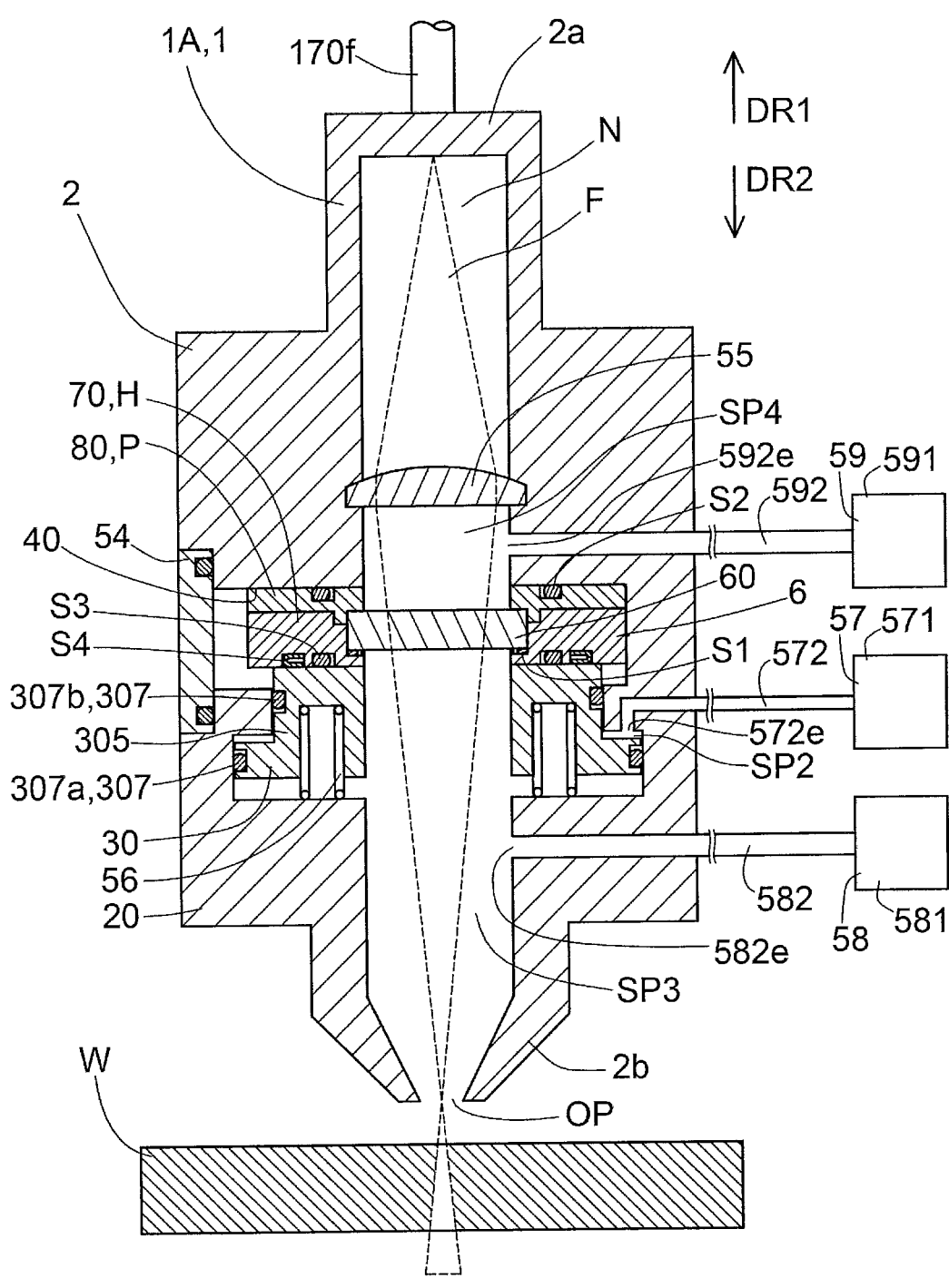
FIG. 10 is a schematic cross-sectional view of part of the laser processor according to the first embodiment.

A laser processor 1A according to a first embodiment will be described with reference to FIGS. 1 to 10. FIG. 1 is a schematic cross-sectional view of part of the laser processor 1A according to the first embodiment. FIG. 2 is an enlarged schematic cross-sectional view of part of FIG. 1. FIGS. 3 and 4 are schematic cross-sectional views of the cartridge 6 to be inserted in a machining head 2. FIG. 3 illustrates a state before a first member 70 (more specifically, a housing H) is pressed toward a second member 80 (more specifically, a pressing ring P), and FIG. 4 illustrates a state after the first member 70 (more specifically, the housing H) is pressed toward the second member 80 (more specifically, the pressing ring P). FIG. 5 is a schematic cross-sectional view of the cartridge 6 according to a first modification to be inserted in the machining head. FIG. 6 is a cross-sectional view taken along line A-A of FIG. 1 as viewed in the direction of arrows. FIG. 7 is a schematic plan view of the pressing ring P. FIG. 8 is a schematic plan view of the housing H. FIG. 9 is a schematic cross-sectional view of the cartridge 6 according to a second modification to be inserted in the machining head 2. FIG. 10 is a schematic cross-sectional view of part of the laser processor 1A according to the first embodiment. In the first embodiment and other embodiments, the cross-sectional view of the machining head omits the illustration of sections and members that exist on the far side of the cross-section of the machining head to avoid the complexity of the drawings.

The laser processor 1A according to the first embodiment includes the machining head 2 and the cartridge 6.

The machining head 2 allows an optical path F of a laser beam to be disposed in the machining head 2. In other words, the machining head 2 includes a passage N through which a laser beam passes. In the embodiment illustrated in FIG. 1, the passage N through which a laser beam passes is parallel to the longitudinal direction of the machining head 2. In FIG. 1, the optical path F is schematically illustrated with a region surrounded by dashed lines. In the embodiment illustrated in FIG. 1, a workpiece W is processed by a laser beam emitted from the machining head 2.

The machining head 2 defines a space SP in which cartridge 6 is disposed. In other words, the machining head 2 includes a receiver 21, which receives the cartridge 6.

The machining head 2 includes a pressing member 30 and a stopper surface 40.

The pressing member 30 presses the cartridge 6. In the embodiment illustrated in FIG. 1, the pressing member 30 is movable in the longitudinal direction of the machining head 2. When the pressing member 30 moves toward the cartridge 6, the pressing member 30 presses the cartridge 6. In the embodiment illustrated in FIG. 1, the pressing member 30 includes a pressing surface 30*p*, which presses the cartridge 6. The pressing surface 30*p* includes, for example, a ring-shaped flat surface.

The stopper surface 40 limits the movement of the cartridge 6 pressed by the pressing member 30 to apply a reaction force to the cartridge 6. In other words, when the direction in which the pressing member 30 presses the cartridge 6 is defined as a first direction DR1, the stopper surface 40 applies a reaction force to the cartridge 6 in a direction opposite to the first direction DR1, that is, in a second direction DR2. Thus, the cartridge 6 is sandwiched between the pressing member 30 and the stopper surface 40. The stopper surface 40 includes, for example, a ring-shaped flat surface. In the embodiment illustrated in FIG. 1, the longitudinal direction of the machining head 2 is parallel to the vertical direction. In the embodiment illustrated in FIG. 1, the first direction DR1 is vertically upward and the second direction DR2 is vertically downward.

In the embodiment illustrated in FIG. 1, the pressing member 30 is movable relative to a body 20 of the machining head 2 (more specifically, the frame of the machining head 2). Meanwhile, in the embodiment illustrated in FIG. 1, the stopper surface 40 is formed by the wall surface of the body 20 of the machining head 2. Alternatively, the stopper surface 40 may be movable relative to the body 20 of the machining head 2. In other words, the pressing member 30 may move relative to the body 20 in the first direction DR1, and the stopper surface 40 may move relative to the body 20 in the second direction DR2, so that the cartridge 6 is sandwiched between the pressing member 30 and the stopper surface 40.

The cartridge 6 is inserted in the machining head 2. In the embodiment illustrated in FIG. 1, a hole 53*h* is formed in a side wall 53 of the machining head 2. The cartridge 6 is inserted to the inside of the machining head 2 (more specifically, in the receiver 21) from the outside of the machining head 2 through the hole 53*h*. The laser processor 1A may include a lid 54 capable of closing the hole 53*h*. The lid 54 may be completely separable from the machining head 2. Alternatively, the lid 54 may be connected to the machining head 2 with a hinge. Further alternatively, the cartridge 6 may include the lid 54. In other words, when the cartridge 6 is inserted in the machining head 2, the lid 54 provided on the cartridge 6 may close the hole 53*h*.

The cartridge 6 includes an optical component 60, a first member 70, and a second member 80.

The optical component 60 is disposed on the optical path F in a state in which the cartridge 6 is inserted in the machining head 2. The optical component 60 is formed of, for example, a transparent member through which a laser beam can be transmitted. The optical component 60 is separate from the first member 70 and the second member 80.

The optical component 60 includes a first surface 61 and a second surface 62. The second surface 62 is on the reverse side of the first surface 61. For example, when the first surface 61 is an outgoing surface from which a laser beam exits, the second surface 62 is an incoming surface from which a laser beam enters. In the embodiment illustrated in FIG. 1, the first surface 61 is a flat surface. The second surface 62 is also a flat surface.

The optical component 60 may include a side surface 63. In the embodiment illustrated in FIG. 1, the side surface 63 couples the first surface 61 and the second surface 62. The side surface 63 is, for example, a cylindrical surface.

The first member 70 is in contact with the first surface 61 of the optical component 60. In the embodiment illustrated in FIG. 1, the first member 70 is also in contact with the pressing member 30.

The second member 80 is in contact with the second surface 62 of the optical component 60. In the embodiment illustrated in FIG. 1, the second member 80 is also in contact with the stopper surface 40. The second member 80 is separate from the first member 70.

In the laser processor 1A according to the first embodiment, the machining head 2 includes the pressing member 30, which presses the cartridge 6, and the stopper surface 40, which applies a reaction force to the cartridge 6. The cartridge 6 includes the first member 70, which comes into contact with the pressing member 30, and the second member 80, which comes into contact with the stopper surface 40. In this case, the first member 70 is pressed by the pressing member 30, and the second member 80 receives a reaction force from the stopper surface 40, so that the cartridge 6 is sandwiched between the pressing member 30 and the stopper surface 40. As a result, the cartridge 6 is secured to the machining head 2 in a stable manner.

In the laser processor 1A according to the first embodiment, the first surface 61 of the optical component 60 is in contact with the first member 70, and the second surface 62 of the optical component 60 is in contact with the second member 80. In this case, the optical component 60 is sandwiched between the first member 70 and the second member 80. As a result, the optical component 60 is secured to the component of the cartridge 6 (more specifically, the first member 70 and the second member 80) in a stable manner.

Optional Structures

Subsequently, optional structures that can be employed by the laser processor 1A according to the first embodiment will be described with reference to FIGS. 1 to 10.

First Member 70 and Second Member 80

In the embodiment illustrated in FIG. 2, the first member 70 is pressed by the pressing member 30, and the first member 70 presses the first surface 61 of the optical component 60. The second member 80 receives a reaction force from the stopper surface 40, and the second member 80 presses the second surface 62 of the optical component 60.

In the embodiment illustrated in FIG. 2, the first surface 61 of the optical component 60 is pressed by the first member 70, and the second surface 62 of the optical component 60 receives a reaction force from the second member 80, so that the optical component 60 is sandwiched between the first member 70 and the second member 80 in a stable manner. As a result, the optical component 60 is secured to the component of the cartridge 6 (more specifically, the first member 70 and the second member 80) in a stable manner.

As illustrated in FIG. 2, the first member 70 is preferably configured to transmit the pressing force received from the pressing member 30 to the first surface 61, and the second member 80 is preferably configured to transmit the reaction force received from the stopper surface 40 to the second surface 62.

In the embodiment illustrated in FIG. 2, the cartridge 6 is secured to the machining head 2 using the pressing force that the first member 70 receives from the pressing member 30. Additionally, the optical component 60 is secured to the component of the cartridge 6 (more specifically, the first member 70 and the second member 80) using the pressing force that the first member 70 receives from the pressing member 30. In this case, pressing the cartridge 6 with the pressing member 30 secures the cartridge 6 to the machining head 2 and also secures the optical component 60 to the first member 70 and the second member 80. This improves the operation efficiency compared with a case in which the cartridge 6 is secured to the machining head 2 at a different time from when the optical component 60 is secured to the first member 70 and the second member 80.

Additionally, in a case in which the optical component 60 is secured to the first member 70 and the second member 80 using the pressing force that the first member 70 receives from the pressing member 30, the first member 70 and the second member 80 do not need to be screwed to each other in advance. If the first member 70 and the second member 80 are screwed to each other, generation of dust is inevitable due to the sliding between the external thread portion and the internal thread portion. If the dust is irradiated with a laser beam and heated, the optical component 60 that comes into contact with the heated dust may possibly be damaged. For example, fiber laser processors used in recent years use a laser beam with a relatively short wavelength, which easily heats the dust. In contrast, the structure in which the first member 70 and the second member 80 are not screwed to each other prevents the generation of dust and thus the damage to the optical component 60.

In the embodiment illustrated in FIG. 2, the first member 70 includes a first contact surface 71, which comes into contact with a peripheral portion 61u of the first surface 61 of the optical component 60, a second contact surface 72, which comes into contact with the pressing member 30, and a first hole 74h through which a laser beam passes. In a case in which the first member 70 is provided with a first sealing member S1, at least part of the first contact surface 71 may be configured by the surface of the first sealing member S1. In a case in which the first member 70 is provided with a third sealing member S3, at least part of the second contact surface 72 may be configured by the surface of the third sealing member S3.

In the embodiment illustrated in FIG. 2, the second member 80 includes a third contact surface 81, which comes into contact with a peripheral portion 62u of the second surface 62 of the optical component 60, a fourth contact surface 82, which comes into contact with the stopper surface 40, and a second hole 84h through which a laser beam passes. In a case in which the second member 80 is provided with a second sealing member S2, at least part of the fourth contact surface 82 may be configured by the surface of the second sealing member S2.

At least one of the first member 70 and the second member 80 may include a wall portion that faces the side surface 63 of the optical component 60. In the embodiment illustrated in FIG. 2, the first member 70 includes a wall portion 75, which faces the side surface 63 of the optical component 60. More specifically, an annular inner wall surface 75n of the wall portion 75 faces the side surface 63 (more specifically, an annular outer surface) of the optical component 60. The second member 80 includes a projection 85, which faces the side surface 63 of the optical component 60. More specifically, an annular inner wall surface 85n of the projection 85 faces the side surface 63 (more specifically, the annular outer surface) of the optical component 60.

Cartridge 6

One of the first member 70 of the cartridge 6 and the second member 80 of the cartridge 6 may include the housing H, which accommodates at least part of the optical component 60. In the embodiment illustrated in FIG. 3, the first member 70 includes the housing H. The first member 70 may include the housing H and the first sealing member S1.

In the embodiment illustrated in FIG. 3, the housing H includes a bottom portion H1 and a wall portion H2. The bottom portion H1 includes an inner edge portion Hd, which projects inward further than the inner wall surface 75n of the wall portion H2. The inner edge portion Hd functions as a support portion, which supports the optical component 60. The inner edge portion Hd defines the first hole 74h through which a laser beam passes.

The wall portion H2 includes the inner wall surface 75n, which faces the side surface 63 of the optical component 60, and an upper surface Ha. When the housing H is pressed toward the pressing ring P, which will be described later, the upper surface Ha of the housing H comes into contact with the pressing ring P.

The other one of the first member 70 and the second member 80 may include the pressing ring P, which comes into contact with the optical component 60. In the embodiment illustrated in FIG. 4, the lower surface of the pressing ring P abuts against both the optical component 60 and the housing H. In the embodiment illustrated in FIG. 4, the second member 80 includes the pressing ring P. The second member 80 may include the pressing ring P and the second sealing member S2.

In the embodiment illustrated in FIG. 4, the pressing ring P includes an outer portion P1 and an inner portion P2. When the housing H is pressed toward the pressing ring P, the outer portion P1 of the pressing ring P comes into contact with the upper surface Ha of the housing H. In the embodiment illustrated in FIG. 4, the outer portion P1 of the pressing ring P is supported by the upper surface Ha of the housing H. The outer portion P1 is, for example, plate-shaped.

The inner portion P2 comes into contact with the optical component 60 (more specifically, the upper surface of the optical component 60). In the embodiment illustrated in FIG. 3, the pressing ring P is placed on the optical component 60. In the embodiment illustrated in FIG. 3, with the pressing ring P placed on the optical component 60, the outer portion P1 is not in contact with the upper surface Ha of the housing H. In other words, a gap G exists between the outer portion P1 and the upper surface Ha of the housing H.

In the embodiment illustrated in FIG. 3, the inner portion P2 includes the projection 85, which projects downward below the lower surface of the outer portion P1. The projection 85 is, for example, an annular projection. In the embodiment illustrated in FIG. 3, the projection 85 is inserted in a depression (more specifically, an annular depression) defined by the housing H and the optical component 60. In this case, the projection 85 determines the position of the pressing ring P, the housing H, and the optical component 60 relative to each other.

In the embodiment illustrated in FIG. 3, the projection 85 faces the side surface 63 of the optical component 60. The projection 85 projects below the upper surface (62) of the optical component 60.

In the embodiment illustrated in FIG. 3, the inner portion P2 includes a second inner wall surface Pn, which defines the second hole 84h through which a laser beam passes, in addition to the inner wall surface 85n, which faces the side surface 63 of the optical component 60. In the embodiment illustrated in FIG. 3, the inner portion P2 (more specifically, the projection 85) includes an outer wall surface Pu. The outer wall surface Pu faces an inner wall surface 751n of the housing H.

In the embodiment illustrated in FIG. 3, the inner portion P2 includes an annular lower surface Pb, which comes into contact with the optical component 60. In the embodiment illustrated in FIG. 3, the annular lower surface Pb, which comes into contact with the optical component 60, is disposed inward of the projection 85 (in other words, closer to the central axis of the optical component 60).

In an embodiment (first modification) illustrated in FIG. 5, a minimum inner diameter D1 of the section of the housing H facing the side surface 63 of the optical component 60 is greater than a minimum inner diameter D2 of the section of the pressing ring P facing the side surface 63 of the optical component 60. In this case, the position of the optical component 60 relative to the housing H is determined using the pressing ring P.

In the embodiment illustrated in FIG. 3, when the optical component 60 is pressed toward the bottom portion H1 of the housing H, the side surface 63 of the optical component 60 slides against the inner wall surface 75n of the housing H. This may possibly generate dust. In the embodiment illustrated in FIG. 5, the minimum inner diameter D1 of the section of the housing H that faces the side surface 63 of the optical component 60 is increased. This prevents or reduces the sliding between the side surface 63 of the optical component 60 and the inner wall surface 75n of the housing H. Increasing the minimum inner diameter D1 decreases the positioning accuracy of the optical component 60 relative to the housing H. To cope with such a situation, in the embodiment illustrated in FIG. 5, the minimum inner diameter D2 of the section of the pressing ring P that faces the side surface 63 of the optical component 60 is set smaller than the minimum inner diameter D1 described above. Thus, the position of the optical component 60 is determined by the pressing ring P when the pressing ring P is placed on the optical component 60 (or the housing H). As a result, the positioning accuracy of the optical component 60 relative to the housing H is improved.

In the embodiment illustrated in FIG. 6, at least part of the pressing ring P is a cantilever portion P3 having one end supported by the housing H.

In the embodiment illustrated in FIG. 6, a distal end portion 52t of a temperature sensor 52 is disposed vertically below the cantilever portion P3 of the pressing ring P supported by the housing H. In this case, the space vertically below the cantilever portion P3 supported by the housing H is effectively used.

The cantilever portion 3 of the pressing ring P supported by the housing H may be subjected to a relatively great bending stress. For example, when the cantilever portion 3 is pressed by the pressing member 30 described above (or the stopper surface 40), the cantilever portion P3 is subjected to a relatively great bending stress. For this reason, the pressing ring P is preferably formed of material that has high bending strength or high tensile strength. The pressing ring P may be formed of material that has the bending strength or the tensile strength higher than that of the material of the housing H.

The volume of the housing H may be greater than the volume of the pressing ring P. The density (in other words, the mass per unit volume) of the housing H may be less than the density of the pressing ring P. When the volume of the housing H is greater than the volume of the pressing ring P, and the density of the housing H is less than the density of the pressing ring P, the weight of the overall cartridge 6 is reduced. Additionally, since the material that has a relatively high density can be selected as the material of the pressing ring P, the bending strength or the tensile strength of the pressing ring P is sufficiently increased.

In the embodiment illustrated in FIG. 3, the cartridge 6 includes the first sealing member S1, the second sealing member S2, and the third sealing member S3.

In the embodiment illustrated in FIG. 3, the first sealing member S1 is disposed between the optical component 60 (more specifically, a laser beam outgoing surface (61) of the optical component 60) and the housing H. The first sealing member S1 prevents, for example, flying debris from the workpiece W (in other words, an object to be processed) processed by a laser beam and other dust from entering the inside of the cartridge 6 (or the space above the cartridge 6) through a gap between the optical component 60 and the housing H. The first sealing member S1 is, for example, a seal ring. The first sealing member S1 is formed of an elastic material such as rubber (for example, fluorine-containing rubber, nitrile rubber, and silicone rubber). In the embodiment illustrated in FIG. 3, a first annular groove V1 for receiving the first sealing member S1 is formed on the upper surface of the inner edge portion Hd of the housing H.

In the embodiment illustrated in FIG. 3, the second sealing member S2 is disposed on an upper surface Pa of the pressing ring P. In the embodiment illustrated in FIG. 3, a second annular groove V2 for receiving the second sealing member S2 is formed on the upper surface Pa of the pressing ring P.

In the embodiment illustrated in FIG. 2, the second sealing member S2 is disposed between the upper surface of the pressing ring P and the stopper surface 40. The second sealing member S2 prevents, for example, dust from entering a space above the cartridge 6 through a gap between the pressing ring P and the stopper surface 40. The second sealing member S2 is, for example, a seal ring. In the embodiment illustrated in FIG. 2, the inner diameter of the second sealing member S2 is greater than the inner diameter of the first sealing member S1. The second sealing member S2 is formed of an elastic material such as rubber (for example, fluorine-containing rubber, nitrile rubber, and silicone rubber).

In the embodiment illustrated in FIG. 3, the first member 70 includes the third sealing member S3. The third sealing member S3 is on a lower surface Hb of the housing H. In the embodiment illustrated in FIG. 3, a third annular groove V3 for receiving the third sealing member S3 is formed on the lower surface Hb of the housing P.

In the embodiment illustrated in FIG. 2, the third sealing member S3 is disposed between the lower surface of the housing H and the pressing member 30. The third sealing member S3 prevents, for example, flying debris from the workpiece W processed by a laser beam and other dust from entering the space between the cartridge 6 and the machining head 2 through a gap between the housing H and the pressing member 30. The third sealing member S3 is, for example, a seal ring. In the embodiment illustrated in FIG. 2, the inner diameter of the third sealing member S3 is greater than the inner diameter of the first sealing member S1. The third sealing member S3 is formed of an elastic material such as rubber (for example, fluorine-containing rubber, nitrile rubber, and silicone rubber).

The cartridge 6 (more specifically, the first member 70) may include a fourth sealing member S4. In the embodiment illustrated in FIG. 3, the fourth sealing member S4 is on the lower surface Hb of the housing H. In the embodiment illustrated in FIG. 3, a fourth annular groove V4 for receiving the fourth sealing member S4 is formed on the lower surface Hb of the housing H. The coefficient of kinetic friction between the fourth sealing member S4 and the wall surface of the machining head 2 is preferably smaller than the coefficient of kinetic friction between the third sealing member S3 and the wall surface of the machining head 2.

The fourth sealing member S4 is formed of, for example, an elastic material such as Teflon (registered trademark) and polyacetal.

In the embodiment illustrated in FIG. 3, in a state before the cartridge 6 is inserted in the machining head 2, a first projecting length L1, which is the length of part of the fourth sealing member S4 that projects from the lower surface Hb of the housing H, is greater than a second projecting length L2, which is the length of part of the third sealing member S3 that projects from the lower surface Hb of the housing H. This prevents or reduces the contact between the third sealing member S3 having a relatively great coefficient of kinetic friction and the wall surface of the machining head 2 during insertion of the cartridge 6 in the machining head 2. Thus, the cartridge 6 including the third sealing member S3 is smoothly inserted in the machining head 2.

In the embodiment illustrated in FIG. 3, the sealing member is not disposed between the pressing ring P and the optical component 60. In other words, the pressing ring P and the optical component 60 are in contact with each other without the sealing member located in between. Alternatively, a sealing member may be disposed between the pressing ring P and the optical component 60.

In the embodiment illustrated in FIG. 6, the cartridge 6 includes a depression 76, which receives the distal end portion 52*t* of the temperature sensor 52. The depression 76 is defined by at least one of the first member 70 and the second member 80. In the embodiment illustrated in FIG. 6, the depression 76 is defined by both the first member 70 and the second member 80. In other words, the depression 76 is defined by part of the first member 70 and part of the second member 80, and the distal end portion 52*t* of the temperature sensor 52 is disposed between the first member 70 and the second member 80. Alternatively, the depression 76 may be defined by one of the first member 70 and the second member 80.

The cartridge 6 provided with the depression 76, which receives the distal end portion 52*t* of the temperature sensor 52, allows the distal end portion 52*t* of the temperature sensor 52 to be disposed close to the optical component 60. The temperature sensor 52 is, for example, a non-contact temperature sensor (more specifically, an infrared temperature sensor).

In the embodiment illustrated in FIG. 6, the distal end portion 52*t* of the temperature sensor 52 faces the optical component 60 (more specifically, the side surface 63 of the optical component 60). When the distal end portion 52*t* of the temperature sensor 52 faces the optical component 60, the temperature of the optical component 60 is more accurately detected. The distal end portion 52*t* of the temperature sensor 52 preferably faces the optical component 60 (more specifically, the side surface 63 of the optical component 60) directly. In other words, the space between the distal end portion 52*t* of the temperature sensor 52 and the optical component 60 preferably has no object.

In the embodiment illustrated in FIG. 6, the cartridge 6 (more specifically, the housing H) includes a third hole 77. In the embodiment illustrated in FIG. 6, the distal end portion 52*t* of the temperature sensor 52 faces the optical component 60 with the third hole 77 located in between.

The insertion of the cartridge 6 in the machining head 2 and the insertion of the distal end portion 52*t* of the temperature sensor 52 in the depression 76 of the cartridge 6 are preferably performed simultaneously. In other words, the insertion of the cartridge 6 in the machining head 2 preferably causes the distal end portion 52t of the temperature sensor 52 to be inserted in the depression 76 of the cartridge 6.

As illustrated in FIG. 6, the direction in which the cartridge 6 is inserted in the machining head 2 is defined as a third direction DR3. As illustrated in FIG. 8, the depression 76 of the cartridge 6 may extend approximately parallel to the third direction DR 3. With the depression 76 of the cartridge 6 extending in the direction approximately parallel to the third direction DR3, the cartridge 6 does not interfere with the temperature sensor 52 during the insertion of the cartridge 6 in the machining head 2.

In an embodiment (second modification) illustrated in FIG. 9, the cartridge 6 includes a handle 90 to be held by an operator. In the embodiment illustrated in FIG. 9, the handle 90 and the housing H are separate, and the handle 90 is mounted on the housing H. A method for mounting the handle 90 on the housing H may include any known method. Alternatively, the handle 90 and the housing H may be one component that is integrally molded.

The handle 90 has a size that, for example, allows handle 90 to be inserted in the hole 53h (refer to FIG. 1 if necessary) of the machining head 2.

In the embodiment illustrated in FIG. 1, the optical component 60 is a protector that protects a second optical component 55 (for example, a focusing lens) disposed in the machining head 2. The optical component 60 prevents, for example, flying debris from the workpiece W processed by a laser beam and other dust from reaching the second optical component 55. In the embodiment illustrated in FIG. 1, the optical component 60 is disposed downstream of the second optical component 55 in the traveling direction of the laser beam. The optical component 60 allows a laser beam to pass through. The optical component 60 is made of, for example, glass. The optical component 60 may be a lens that converges or diverges a laser beam.

Machining Head 2

In the embodiment illustrated in FIG. 10, the machining head 2 includes the body 20, the pressing member 30, which is movable relative to the body 20, and the stopper surface 40. The machining head 2 may include an urging member 56, which urges the pressing member 30 in the first direction DR1.

In the embodiment illustrated in FIG. 10, the pressing member 30 includes a piston 305 and seal rings 307 (more specifically, a first seal ring 307a and a second seal ring 307b) disposed on the outer circumferential surface of the piston 305. The pressing member 30 is slidable relative to the body 20 of the machining head 2.

In the embodiment illustrated in FIG. 10, the urging member 56 includes a spring that urges the pressing member 30 in the first direction DR1. In the embodiment illustrated in FIG. 10, the urging member 56 is disposed between the pressing member 30 and the body 20 of the machining head 2.

In the embodiment illustrated in FIG. 10, the machining head 2 includes a distal end portion 2b, at which a laser nozzle OP is disposed, and a proximal end portion 2a. In the embodiment illustrated in FIG. 10, an optical fiber 170f, which transmits a laser beam to the machining head 2, is connected to the proximal end portion 2a.

Pressing Member Drive Device 57

The laser processor 1A may include a pressing member drive device 57, which drives the pressing member 30. In the embodiment illustrated in FIG. 10, the pressing member drive device 57 includes a first gas supply source 571 such as an air compressor, and a first gas supply passage 572. At least part of the first gas supply passage 572 is disposed in the body 20 of the machining head 2.

In the embodiment illustrated in FIG. 10, a downstream end portion 572e of the first gas supply passage 572 communicates with a space SP2 between the pressing member 30 and the body 20 of the machining head 2. The lower end of the space SP2 is sealed by the first seal ring 307a, and the upper end of the space SP is sealed by the second seal ring 307b. In the embodiment illustrated in FIG. 10, when gas is supplied to the space SP2 through the first gas supply passage 572 from the first gas supply source 571, the gas supplied to the space SP2 presses the pressing member 30 in the second direction DR2. As a result, the pressing member 30 moves in the second direction DR2.

Assist Gas Supplier 58

The laser processor 1A may include an assist gas supplier 58, which supplies an assist gas to the machining head 2. The assist gas supplier 58 includes an assist gas supply source 581 and an assist gas supply passage 582. At least part of the assist gas supply passage 582 is disposed in the body 20 of the machining head 2.

In the embodiment illustrated in FIG. 10, a downstream end portion 582e of the assist gas supply passage 582 communicates with a space SP3 between the cartridge 6 and the laser nozzle OP of the machining head 2. The assist gas supplied to the space SP3 is discharged from the laser nozzle OP. The assist gas discharged from the laser nozzle OP blows away the molten material of the workpiece W formed by the radiation of the laser beam. Thus, the assist gas assists the laser processing of the workpiece W. The gas supplied by the assist gas supplier 58 is, for example, air, nitrogen gas, or oxygen gas that promotes melting of the workpiece W.

In the embodiment illustrated in FIG. 10, the assist gas supply source 581 and the first gas supply source 571 are different gas supply sources. Alternatively, the assist gas supply source 581 and the first gas supply source 571 may be formed by one gas supply source.

Clean Gas Supplier 59

The laser processor 1A may include a clean gas supplier 59, which supplies a cleaning gas to the machining head 2. The clean gas supplier 59 includes a clean gas supply source 591 and a clean gas supply passage 592. At least part of the clean gas supply passage 592 is disposed in the body 20 of the machining head 2.

In the embodiment illustrated in FIG. 10, a downstream end portion 592e of the clean gas supply passage 592 communicates with a space SP4 closer to the proximal end than the position where the cartridge 6 is disposed (more specifically the space between the cartridge 6 and the second optical component 55). The cleaning gas supplied to the space SP4 prevents dust from entering or reduces the dust that enters the space SP4 closer to the proximal end than the position where the cartridge 6 is disposed.

In the embodiment illustrated in FIG. 10, the clean gas supply source 591, the first gas supply source 571, and the assist gas supply source 581 are different gas supply sources. Alternatively, the clean gas supply source 591 and the first gas supply source 571 or the assist gas supply source 581 may be formed by one gas supply source.

Second Embodiment

Figure 11:
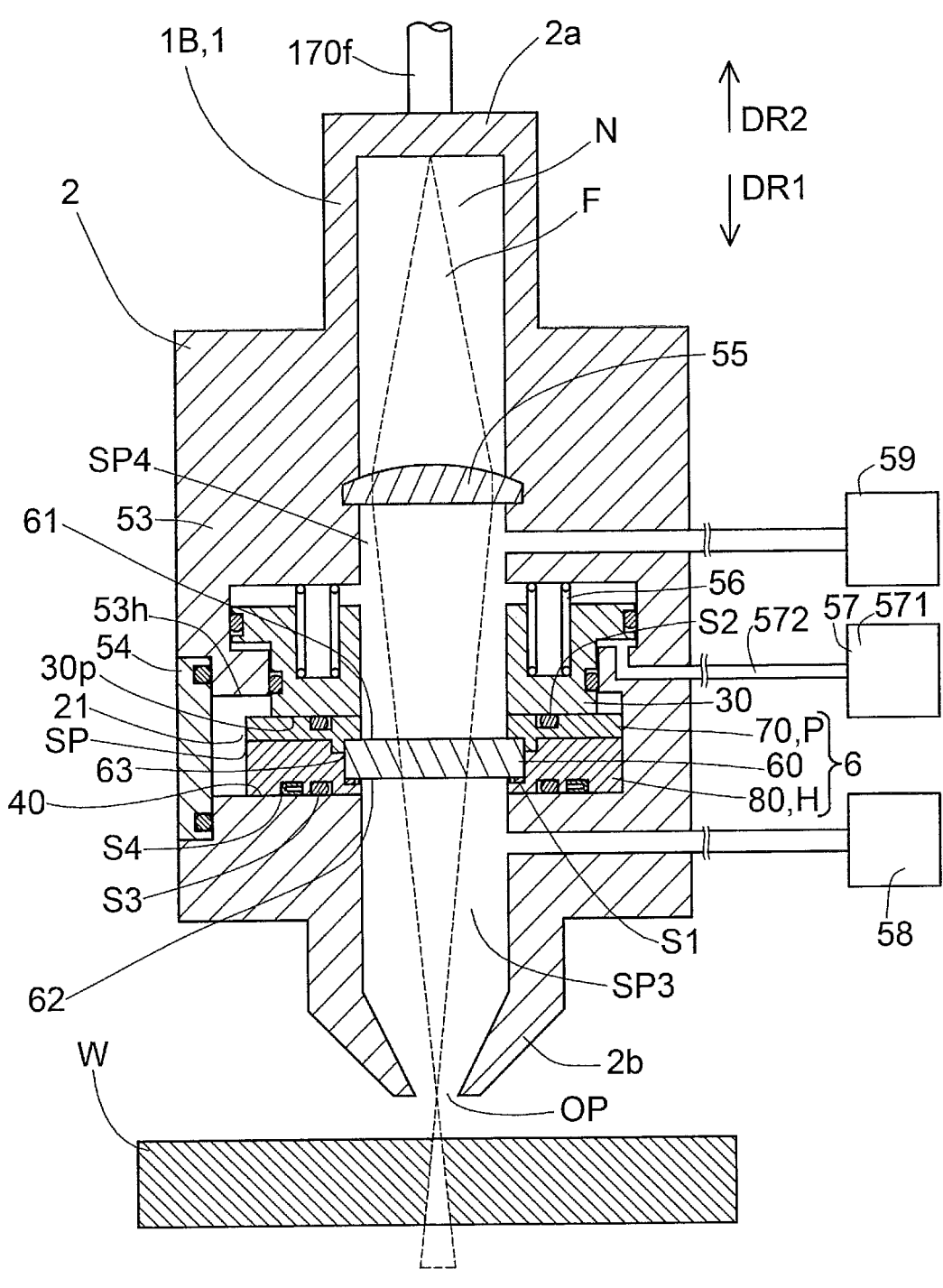
FIG. 11 is a schematic cross-sectional view of part of a laser processor according to a second embodiment.

A laser processor 1B according to a second embodiment will be described with reference to FIG. 11. FIG. 11 is a schematic cross-sectional view of part of the laser processor 1B according to the second embodiment.

In the second embodiment, the differences from the first embodiment will mainly be described. Meanwhile, in the second embodiment, redundant descriptions of items that have already been described in the first embodiment are omitted. Therefore, in the second embodiment, even without an explicit description, it will be readily understood that the items that have already been described in the first embodiment may be applied to the second embodiment. For example, in the second embodiment, the cartridge 6 illustrated in FIGS. 1 to 10 may be employed as the cartridge 6 to be inserted in the machining head 2. The temperature sensor 52 that can be inserted in the depression 76 (refer to FIG. 6) of the cartridge 6 may be mounted on the machining head 2.

In the first embodiment, the first surface 61 of the optical component 60 is the outgoing surface from which the laser beam exits, and the second surface 62 of the optical component 60 is the incoming surface from which the laser beam enters. In the first embodiment, the housing H is pressed by the pressing member 30, and the pressing ring P receives a reaction force from the stopper surface 40. In contrast, in the second embodiment, the first surface 61 of the optical component 60 is the incoming surface from which the laser beam enters, and the second surface 62 of the optical component 60 is the outgoing surface from which the laser beam exits. In the second embodiment, the pressing ring P is pressed by the pressing member 30, and the housing H receives a reaction force from the stopper surface 40.

The laser processor 1B according to the second embodiment includes the machining head 2, in which the optical path F of the laser beam is disposed, and the cartridge 6 to be inserted in the machining head 2. The machining head 2 includes the pressing member 30, which presses the cartridge 6, and the stopper surface 40, which limits the movement of the cartridge 6 pressed by the pressing member 30 to apply a reaction force to the cartridge 6. The cartridge 6 includes the optical component 60, which is disposed on the optical path F described above in a state in which the cartridge 6 is inserted in the machining head 2, the first member 70, which comes into contact with the first surface 61 of the optical component 60 and the pressing member 30, and the second member 80, which comes into contact with the second surface 62 of the optical component 60 and the stopper surface 40.

In the laser processor 1B according to the second embodiment, the machining head 2 includes the pressing member 30, which presses the cartridge 6, and the stopper surface 40, which applies a reaction force to the cartridge 6. The cartridge 6 includes the first member 70, which comes into contact with the pressing member 30, and the second member 80, which comes into contact with the stopper surface 40. The laser processor 1B according to the second embodiment has the same advantages as the laser processor 1A according to the first embodiment.

The differences between the laser processor 1B according to the second embodiment and the laser processor 1A according to the first embodiment will further be described.

In the embodiment illustrated in FIG. 11, the pressing member 30 moves in the first direction DR1, which is the direction toward the cartridge 6, so that the pressing member 30 presses the cartridge 6. The stopper surface 40 limits the movement of the cartridge 6 pressed by the pressing member 30 to apply a reaction force to the cartridge 6. The stopper surface 40 applies a reaction force to the cartridge 6 in the second direction DR2, which is the direction opposite to the first direction DR1. In the embodiment illustrated in FIG. 11, the longitudinal direction of the machining head 2 is parallel to the vertical direction. In the embodiment illustrated in FIG. 11, the first direction DR1 is vertically downward and the second direction DR2 is vertically upward.

In the embodiment illustrated in FIG. 10, the first member 70 includes the housing H, and the second member 80 includes the pressing ring P. In contrast, in the embodiment illustrated in FIG. 11, the first member 70 includes the pressing ring P, and the second member 80 includes the housing H. The first member 70 may include the second sealing member S2. In the embodiment illustrated in FIG. 11, the second sealing member S2 is disposed on the upper surface of the pressing ring P. More specifically, the second sealing member S2 is disposed between the upper surface of the pressing ring P and the pressing member 30.

The second member 80 may include the first sealing member S1. In the embodiment illustrated in FIG. 11, the first sealing member S1 is disposed between the housing H and the optical component 60. More specifically, the first sealing member S1 is disposed between the housing H and the laser beam outgoing surface (the second surface 62 in FIG. 11) of the optical component 60.

The second member 80 may include the third sealing member S3 and/or the fourth sealing member S4. In the embodiment illustrated in FIG. 11, the third sealing member S3 and the fourth sealing member S4 are disposed on the lower surface of the housing H. More specifically, the third sealing member S3 is disposed between the lower surface of the housing H and the stopper surface 40. The fourth sealing member S4 is also disposed between the lower surface of the housing H and the stopper surface 40.

In the embodiment illustrated in FIG. 10, the pressing member 30 is disposed closer to the distal end of the machining head 2 than the cartridge 6. The pressing member 30 presses the cartridge 6 in the direction toward the proximal end portion 2a of the machining head 2. In contrast, in the embodiment illustrated in FIG. 11, the pressing member 30 is disposed closer to the proximal end of the machining head 2 than the cartridge 6. The pressing member 30 presses the cartridge 6 in the direction toward the distal end portion 2b of the machining head 2.

Third Embodiment

Figure 12:
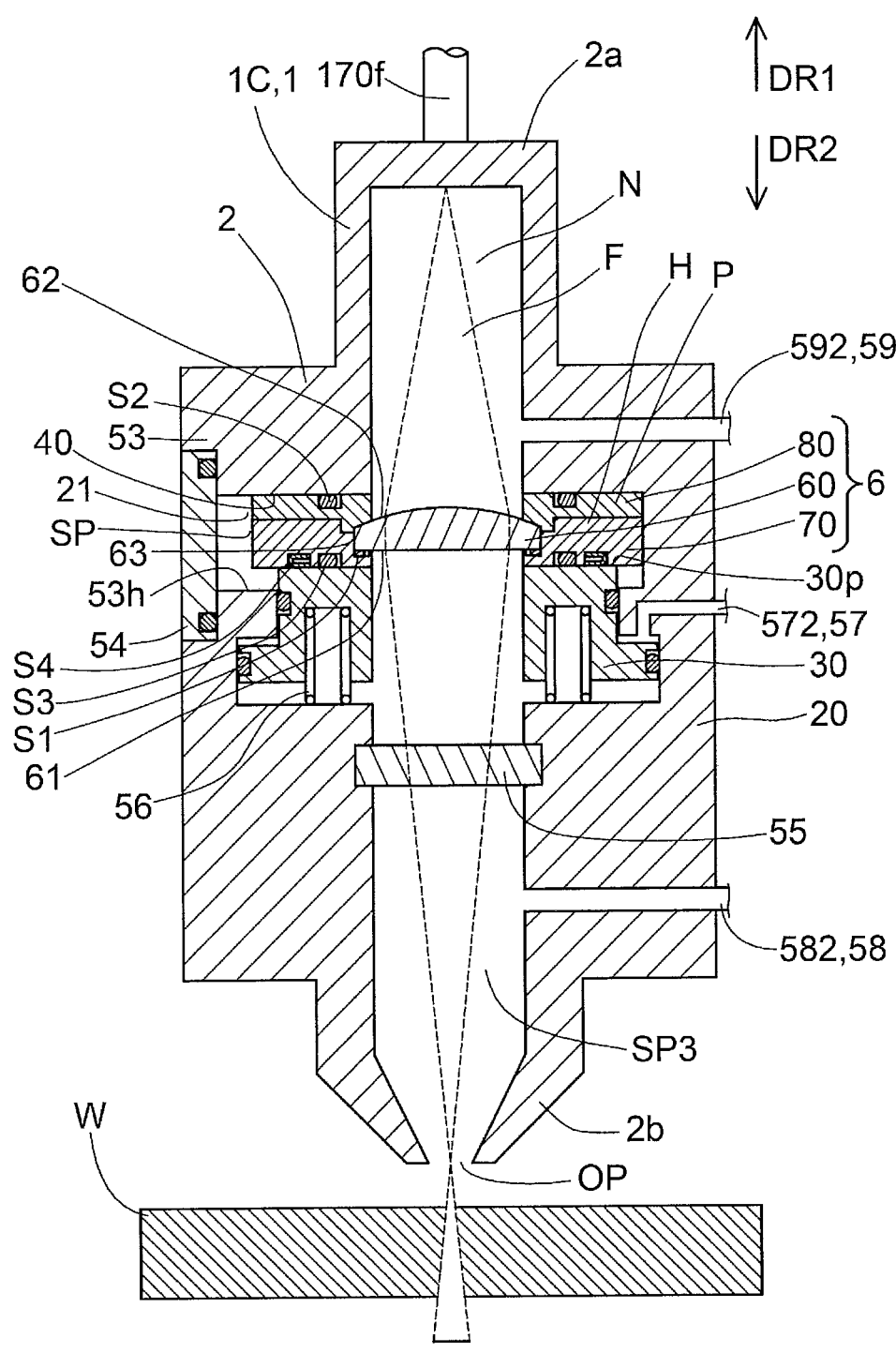
FIG. 12 is a schematic cross-sectional view of part of a laser processor according to a third embodiment.
Figure 13:
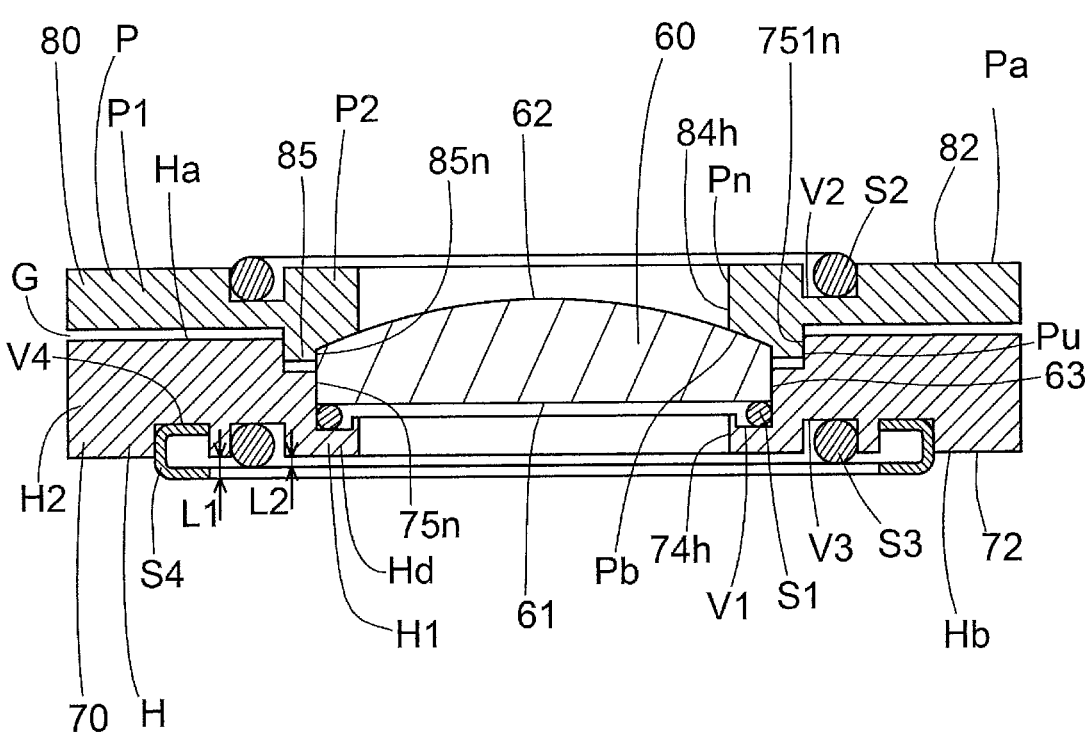
FIG. 13 is a schematic cross-sectional view of a cartridge according to a third modification to be inserted in the machining head.

A laser processor 1C according to a third embodiment will be described with reference to FIGS. 12 and 13. FIG. 12 is a schematic cross-sectional view of part of the laser processor 1C according to the third embodiment. FIG. 13 is a schematic cross-sectional view of the cartridge 6 according to the third modification to be inserted in the machining head 2.

In the third embodiment, the differences from the first embodiment and the second embodiment will mainly be described. Meanwhile, in the third embodiment, redundant descriptions of items that have already been described in the first embodiment or the second embodiment are omitted. Therefore, in the third embodiment, even without an explicit description, it will be readily understood that the items that have already been described in the first embodiment or the second embodiment may be applied to the third embodiment. For example, like the embodiment illustrated in FIG. 6, the cartridge 6 may include the depression 76, which receives the distal end portion 52t of the temperature sensor 52. For example, like the embodiment illustrated in FIG. 9, the cartridge 6 may include the handle 90. Furthermore, in the third embodiment, the pressing member 30 may press the cartridge 6 toward the proximal end portion 2a like the embodiment illustrated in FIG. 10, or the pressing member 30 may press the cartridge 6 toward the distal end portion 2b like the embodiment illustrated in FIG. 11.

In the third embodiment, the optical component 60 included in the cartridge 6 is a lens that converges or diverges a laser beam. More specifically, the optical component 60 is a focusing lens that converges a laser beam.

The laser processor 1C according to the third embodiment includes the machining head 2, in which the optical path F of the laser beam is disposed, and the cartridge 6 to be inserted in the machining head 2. The machining head 2 includes the pressing member 30, which presses the cartridge 6, and the stopper surface 40, which limits the movement of the cartridge 6 pressed by the pressing member 30 to apply a reaction force to the cartridge 6. The cartridge 6 includes the optical component 60, which is disposed on the optical path F described above in a state in which the cartridge 6 is inserted in the machining head 2, the first member 70, which comes into contact with the first surface 61 of the optical component 60 and the pressing member 30, and the second member 80, which comes into contact with the second surface 62 of the optical component 60 and the stopper surface 40.

In the laser processor 1C according to the third embodiment, the machining head 2 includes the pressing member 30, which presses the cartridge 6, and the stopper surface 40, which applies a reaction force to the cartridge 6. The cartridge 6 includes the first member 70, which comes into contact with the pressing member 30, and the second member 80, which comes into contact with the stopper surface 40. The laser processor 1C according to the third embodiment has the same advantages as the laser processor 1A according to the first embodiment or the laser processor 1B according to the second embodiment.

The differences between the laser processor 1C according to the third embodiment and the laser processor 1A according to the first embodiment or the laser processor 1B according to the second embodiment will further be described.

In the embodiment illustrated in FIG. 12, the optical component 60 included in the cartridge 6 is a lens (more specifically, a focusing lens). In the embodiment illustrated in FIG. 12, the optical component 60 is disposed upstream of the second optical component 55 disposed in the machining head 2 in the traveling direction of the laser beam in a state in which the cartridge 6 is inserted in the machining head 2. The second optical component 55 is a protector that protects the cartridge 6 (more specifically, the optical component 60) disposed in the machining head 2 from, for example, flying debris from the workpiece W processed by a laser beam and other dust.

At least one of the first surface 61 and the second surface 62 of the optical component 60 is a curved surface (for example, a convex surface or a concave surface). In the embodiment illustrated in FIG. 12, the laser beam incoming surface of the optical component 60 is a curved surface (more specifically, the convex surface). Additionally, in the embodiment illustrated in FIG. 12, the laser beam outgoing surface of the optical component 60 is a flat surface.

In the embodiment illustrated in FIG. 12, the second surface 62 of the optical component 60 is the incoming surface from which the laser beam enters, and the first surface 61 of the optical component 60 is the outgoing surface from which the laser beam exits. Alternatively, like the embodiment illustrated in FIG. 11, the first surface 61 of the optical component 60 may be the incoming surface from which the laser beam enters, and the second surface 62 of the optical component 60 may be the outgoing surface from which the laser beam exits.

In the embodiment illustrated in FIG. 13, the second member 80 of the cartridge 6 (more specifically, the pressing ring P) comes into contact with the second surface 62 of the optical component 60 (more specifically, the incoming surface from which a laser beam enters). In the embodiment illustrated in FIG. 13, the inner portion P2 of the pressing ring P includes the annular lower surface Pb. The annular lower surface Pb comes into contact with the optical component 60. The annular lower surface Pb preferably has a curved surface that is complementary to the curved surface of the optical component 60. In the embodiment illustrated in FIG. 13, the annular lower surface Pb, which comes into contact with the optical component 60, is disposed inward of the projection 85 (in other words, closer to the central axis of the optical component 60).

Method for Mounting Cartridge

Figure 14:
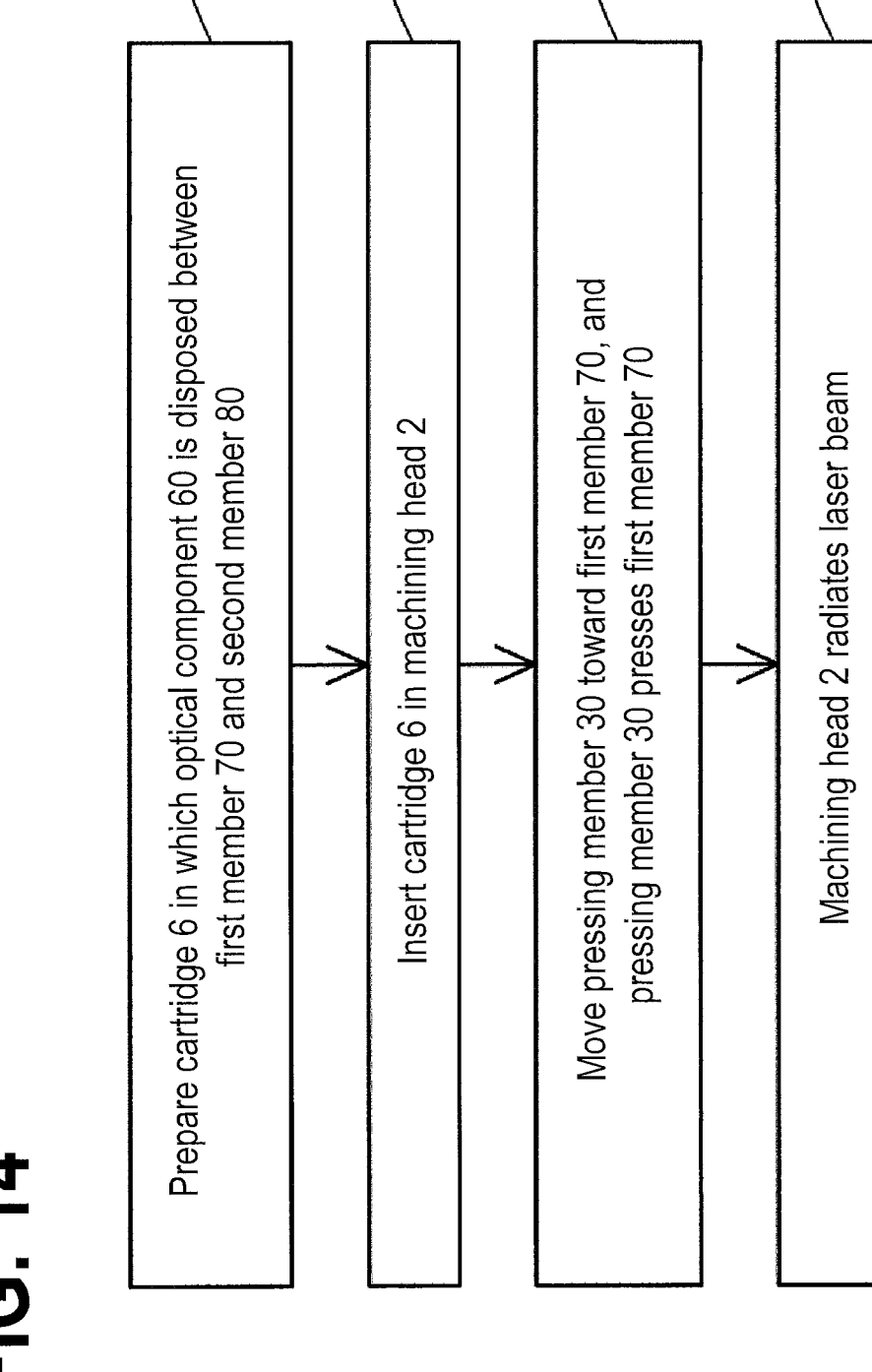
FIG. 14 is a flowchart illustrating an embodiment of a method for mounting the cartridge according to the embodiments.
Figure 15:
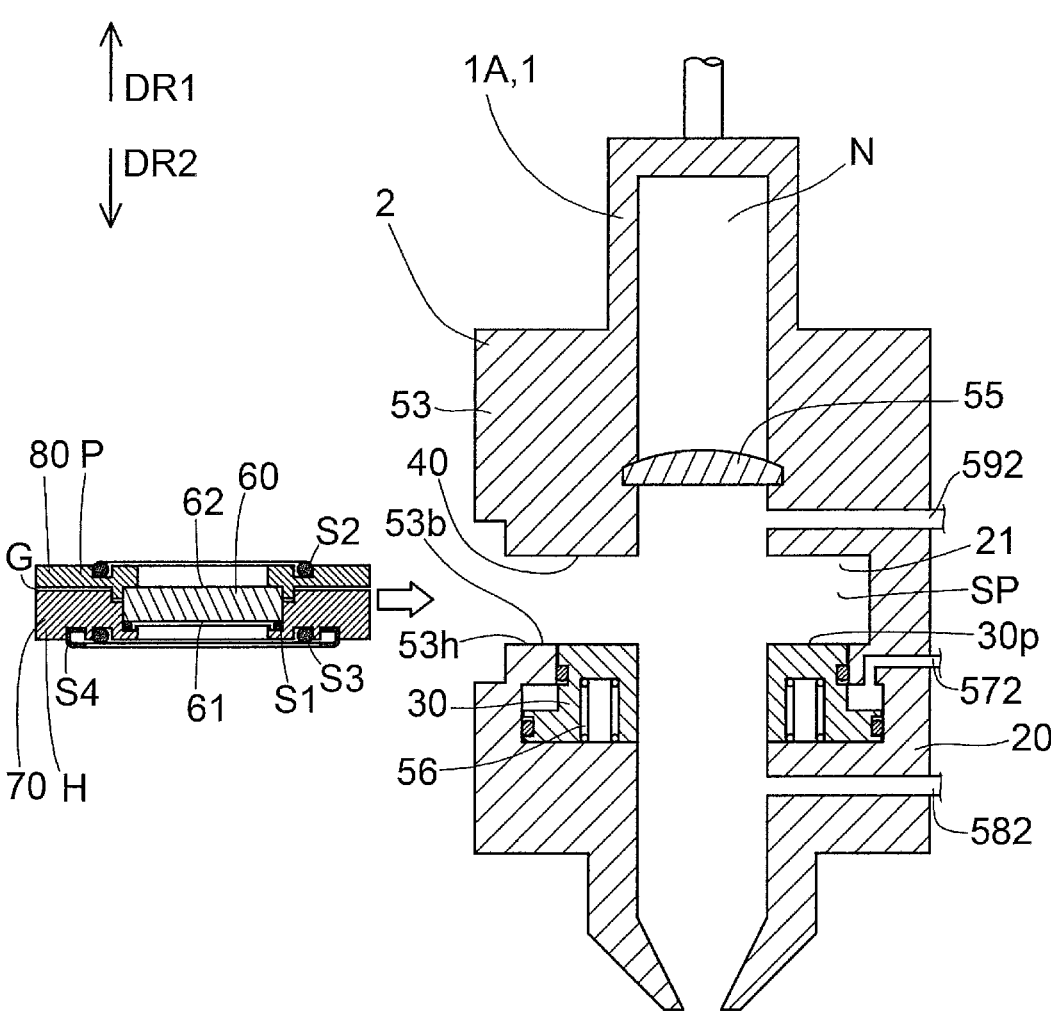
FIG. 15 is a schematic diagram illustrating the manner of an inserting step in execution according to an embodiment.
Figure 16:
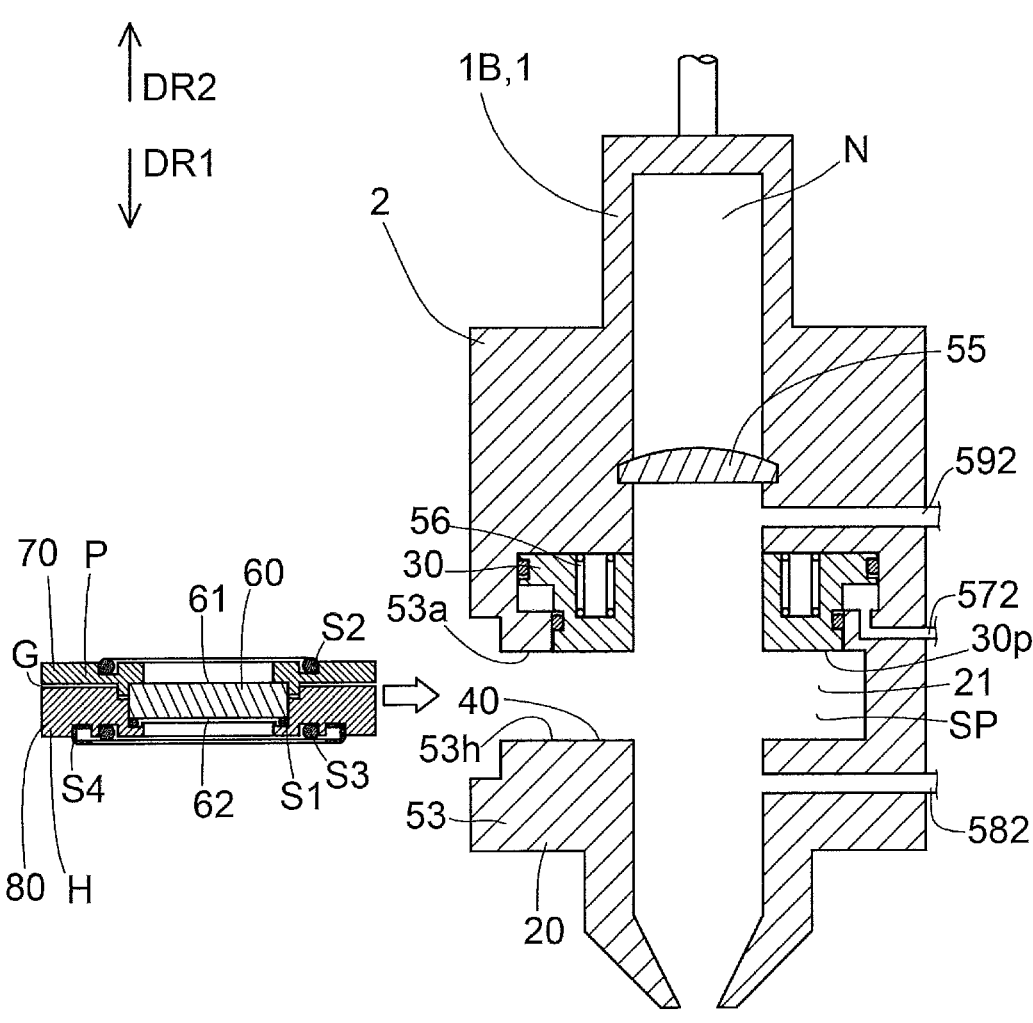
FIG. 16 is a schematic diagram illustrating the manner of an inserting step in execution according to another embodiment.
Figure 17:
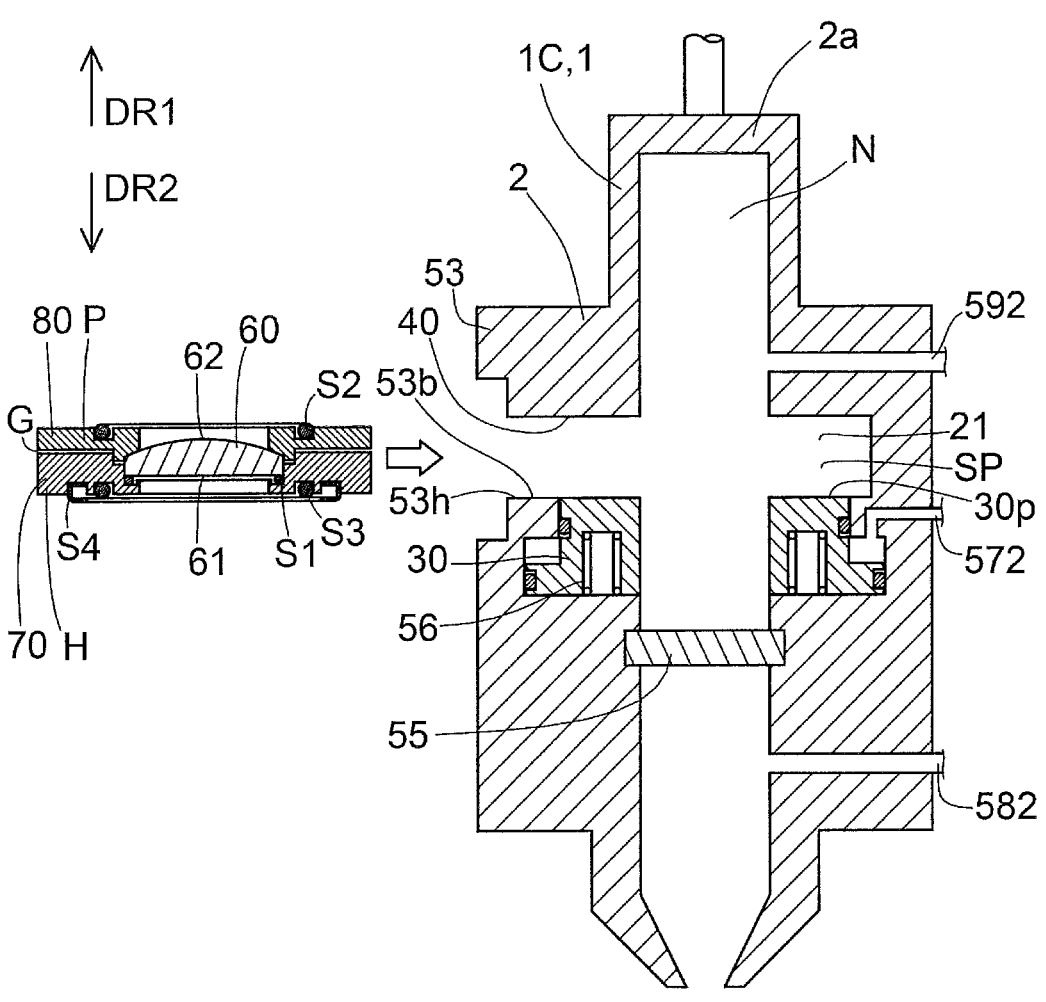
FIG. 17 is a schematic diagram illustrating the manner of an inserting step in execution according to even another embodiment.

Subsequently, a method for mounting the cartridge according to the embodiments will be described with reference to FIGS. 1 to 17. FIG. 14 is a flowchart illustrating an embodiment of the method for mounting the cartridge according to the embodiments. FIGS. 15 to 17 are schematic diagrams illustrating the manner of an inserting step in execution.

The method for mounting the cartridge according to the embodiments is a method for mounting the cartridge 6 on the laser processor 1. The laser processor 1 used in the method for mounting the cartridge according to the embodiments may be the laser processor 1A according to the first embodiment, the laser processor 1B according to the second embodiment, the laser processor 1C according to the third embodiment, or other laser processors.

The laser processor 1 used in the method for mounting the cartridge according to the embodiments includes the machining head 2, the pressing member 30, and the stopper surface 40 as illustrated in figures such as FIGS. 1, 2, 6, and 10 to 12. The machining head 2 is provided with the optical path F for a laser beam and defines a space in which the cartridge 6 is to be disposed. The pressing member 30 presses the cartridge 6. The stopper surface 40 limits the movement of the cartridge 6 pressed by the pressing member 30 to apply a reaction force to the cartridge 6.

As illustrated in figures such as FIGS. 3 to 9 and FIG. 13, the cartridge 6 used in the method for mounting the cartridge according to the embodiments includes the optical component 60 through which a laser beam passes, the first member 70, which comes into contact with the first surface 61 of the optical component 60, and the second member 80, which comes into contact with the second surface 62 of the optical component 60. The second surface 62 is on the reverse side of the first surface 61.

At the first step ST1, the cartridge 6 is prepared in which the optical component 60 is disposed between the first member 70 and the second member 80. The first step ST1 is a preparing step. One of the first member 70 and the second member 80 may include the housing H. The other one of the first member 70 and the second member 80 may include the pressing ring P. Figures such as FIGS. 3, 9, and 13 illustrate the cartridge 6 prepared at the first step ST1 (preparing step).

At the first step ST1 (preparing step), for example, firstly, the optical component 60 is placed on the housing H. With the optical component 60 placed on the housing H, the optical component 60 may be accommodated in the housing H.

At the first step ST1 (preparing step), for example, secondly, the pressing ring P is placed on the optical component 60 placed on the housing H. In the embodiments illustrated in figures such as FIGS. 3, 9, and 13, with the pressing ring P placed on the optical component 60, the pressing ring P comes into contact with the upper surface (more specifically, the laser beam incoming surface) of the optical component 60.

In the embodiments illustrated in figures such as FIGS. 3, 9, and 13, the cartridge 6 in which the optical component 60 is disposed between the first member 70 and the second member 80 is prepared by only placing the optical component 60 on one of the first member 70 and the second member 80 and placing the other one of the first member 70 and the second member 80 on the optical component 60. More specifically, the cartridge 6, which will be inserted in the machining head 2 in the later-described inserting step, is prepared by only placing the pressing ring P on the optical component 60 accommodated in the housing H.

The preparing step described above is preferably executable without rotating the second member 80 relative to the first member 70. The cartridge 6 is efficiently prepared without the need for rotating the second member 80 relative to the first member 70. When the second member 80 is not rotated relative to the first member 70, dust is not generated due to the sliding involved in the relative rotation.

In the embodiments illustrated in figures such as FIGS. 3, 9, and 13, the pressing ring P is a component without a thread portion (in other words, a threadless component). Thus, no dust is generated due to the sliding between the external thread portion and the internal thread portion during execution of a process of placing the optical component 60 between the first member 70 and the second member 80.

In the embodiments illustrated in figures such as FIGS. 3, 9, and 13, the cartridge 6 prepared through the preparing step (in other words, the cartridge 6, which will be inserted in the machining head 2 in the later-described inserting step) is an assembly with the optical component 60 unfixed to the first member 70 and the second member 80. Since a process for fixing the optical component 60 is unnecessary, the cartridge 6 is efficiently prepared. In the present embodiment, the term "fix" means a state in which the optical component 60 is completely fixed to the first member 70 and the second member 80 by, for example, screw coupling, adhesion, or pressure welding so that no relative movement occurs. Therefore, just a temporary fixing does not correspond to the "fixing" in this specification.

At the second step ST2, the cartridge 6 is inserted in the machining head 2. The second step ST2 is the inserting step. FIGS. 15, 16, and 17 illustrate the manner of the second step ST2 (inserting step) in execution.

At the second step ST2 (inserting step), the cartridge 6 is inserted in the machining head 2 with the optical component 60 unfixed to the first member 70 and the second member 80.

At the second step ST2 (inserting step), the cartridge 6 is inserted in the machining head 2 through the hole 53h of the machining head 2. In the embodiments illustrated in FIGS. 15 to 17, the hole 53h is formed in the side wall 53 of the machining head 2. In this case, the cartridge 6 is inserted in the machining head 2 through the hole 53h by moving the cartridge 6 in a direction perpendicular to the longitudinal direction of the machining head 2.

Note that, before the execution of the second step ST2 (inserting step), the hole 53h of the machining head 2 is opened (more specifically, the lid 54 is moved to a position for opening the hole 53h).

The pressing member 30 is preferably moved to a retracted position so as not to interfere with the cartridge 6 before the execution of the second step ST2 (inserting step). Since the pressing member 30 is moved to the retracted position, the cartridge 6 is smoothly inserted in the machining head 2. The pressing member 30 is moved to the retracted position by, for example, a pressing member drive device. For example, gas is supplied to the first gas supply passage 572, which forms part of the pressing member drive device. This moves the pressing member 30 to the retracted position (or in the second direction DR2).

In the embodiments illustrated in FIGS. 15 and 17, the second step ST2 (inserting step) is executed with a lower surface 53b of the wall that defines the hole 53h being flush with the pressing surface 30p of the pressing member 30. In other words, the inserting step is executed without a step formed between the lower surface 53b of the wall that defines the hole 53h and the pressing surface 30p of the pressing member 30. In this case, the cartridge 6 is smoothly inserted in the receiver 21 of the machining head 2 through the hole 53h.

In the embodiment illustrated in FIG. 16, the second step ST2 (inserting step) is executed with an upper surface 53a of the wall that defines the hole 53h being flush with the pressing surface 30p of the pressing member 30. In other words, the inserting step is executed without a step formed between the upper surface 53a of the wall that defines the hole 53h and the pressing surface 30p of the pressing member 30. In this case, the cartridge 6 is smoothly inserted in the receiver 21 of the machining head 2 through the hole 53h.

During the execution of the second step ST2 (inserting step), a clean gas is preferably supplied to the machining head 2 by the clean gas supplier. Supplying the clean gas to the machining head 2 prevents dust from entering or reduces the dust that enters the position closer to the proximal end than the cartridge 6 during the execution of the inserting step. The clean gas is supplied by the clean gas supplier. In the embodiments illustrated in FIGS. 15 and 16, the clean gas is supplied to the space between the receiver 21, which receives the cartridge 6, and the second optical component 55, from the clean gas supply passage 592, which forms part of the clean gas supplier. In the embodiment illustrated in FIG. 17, the clean gas is supplied to the space between the receiver 21, which receives the cartridge 6, and the second proximal end portion 2a of the machining head 2, from the clean gas supply passage 592, which forms part of the clean gas supplier.

After the execution of the second step ST2 (inserting step), the hole 53h of the machining head 2 is closed by the lid 54.

At the third step ST3, the pressing member 30 is moved toward the first member 70. The third step ST3 is a moving step. FIGS. 1, 2, 6, and 10 to 12 illustrate the state after the third step ST3 (moving step) is executed.

At the third step ST3 (moving step), the pressing member 30 moves toward the first member 70 resulting in pressing the first member 70 in the first direction DR1.

The third step ST3 (moving step) may be executed using the urging force of the urging member 56. For example, when the supply of gas from the first gas supply source 571 to the first gas supply passage 572 is stopped, the pressing member 30 moves from the retracted position to an advanced position at which the pressing member 30 presses the first member 70 by the urging force of the urging member 56. In this manner, the first member 70 is pressed by the pressing member 30.

In the embodiments illustrated in figures such as FIGS. 10, 11, and 12, the execution of the third step ST3 (moving step) causes the pressing member 30 of the machining head 2 to come into contact with the first member 70, and the stopper surface 40 of the machining head 2 to come into contact with the second member 80.

In the embodiments illustrated in figures such as FIGS. 10, 11, and 12, the execution of the third step ST3 (moving step) increases a first pressing force of the first member 70 pressing the first surface 61 of the optical component 60 and a second pressing force of the second member 80 pressing the second surface 62 of the optical component 60. In this manner, the optical component 60 is secured to the first member 70 and the second member 80.

In the embodiments illustrated in figures such as FIGS. 10, 11, and 12, the first member 70 is pressed by the pressing member 30, and the first member 70 presses the first surface 61 of the optical component 60. The second member 80 receives a reaction force from the stopper surface 40, and the second member 80 presses the second surface 62 of the optical component 60. Thus, in the embodiments illustrated in figures such as FIGS. 10, 11, and 12, the optical component 60 is secured to the first member 70 and the second member 80 using the pressing force of the pressing member 30 that presses the first member 70 (hereinafter, referred to as the "third pressing force" for convenience).

In the embodiments illustrated in figures such as FIGS. 10, 11, and 12, pressing the cartridge 6 with the pressing member 30 secures the cartridge 6 to the machining head 2 and also secures the optical component 60 to the first member 70 and the second member 80. Thus, two securing tasks are efficiently performed.

In the embodiments illustrated in figures such as FIGS. 10, 11, and 12, at the third step ST3 (moving step), the first sealing member S1, which is disposed between the housing H and the optical component 60, is compressed using the third pressing force of the pressing member 30 that presses the first member 70 of the cartridge 6. This improves the sealing between the housing H and the optical component 60.

In the embodiments illustrated in figures such as FIGS. 10, 11, and 12, at the third step ST3 (moving step), the second sealing member S2, which is disposed between the pressing ring P and the stopper surface 40 or the pressing member 30, is compressed using the third pressing force of the pressing member 30 that presses the first member 70 of the cartridge 6. This improves the sealing between the pressing ring P and the stopper surface 40 or the pressing member 30.

In the embodiments illustrated in figures such as FIGS. 10, 11, and 12, at the third step ST3 (moving step), the third sealing member S3 (or the third sealing member S3 and the fourth sealing member S4), which is disposed between the housing H and the pressing member 30 or the stopper surface 40, is compressed using the third pressing force of the pressing member 30 pressing the first member 70 of the cartridge 6. This improves the sealing properties between the housing H and the pressing member 30 or the stopper surface 40.

In the embodiments illustrated in FIGS. 15 to 17, a gap G exists between the first member 70 and the second member 80 before the execution of the third step ST3 (moving step). In this case, the gap G is preferably eliminated by the execution of the third step ST3 (moving step). More specifically, the execution of the third step ST3 (moving step) preferably brings the first member 70 and the second member 80 into surface contact with each other.

At the fourth step ST4, a laser beam is radiated through the laser nozzle OP of the machining head 2. The fourth step ST4 is a radiation step.

At the fourth step ST4 (radiation step), a laser beam supplied to the machining head 2 from a laser source passes through the optical component 60. The laser beam that has passed through the optical component 60 is radiated through the laser nozzle OP onto the workpiece W. Thus, the workpiece W is processed by the laser beam. For example, the workpiece W is cut, drilled, or welded by the laser beam emitted through the laser nozzle OP.

During the execution of the fourth step ST4 (radiation step), an assist gas is preferably supplied to the machining head 2 by the assist gas supplier 58. The assist gas supplied to the machining head 2 blows onto the workpiece W through the machining head 2. Thus, the molten material of the workpiece W is blown off the workpiece W.

Fourth Embodiment

Figure 18:
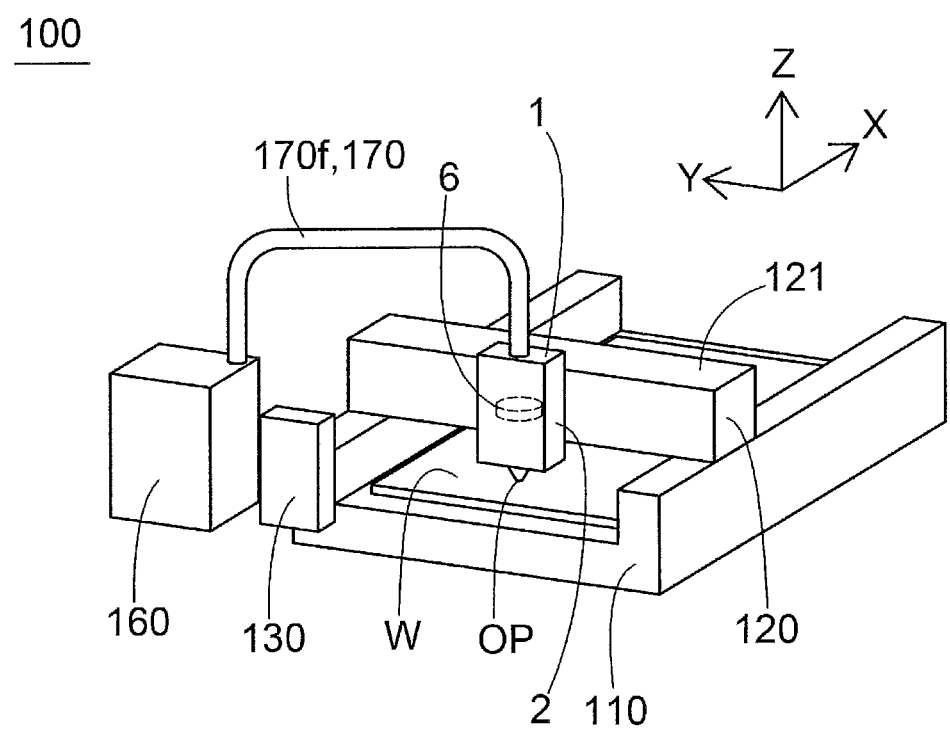
FIG. 18 is a schematic perspective view of a laser processing system according to a fourth embodiment.

The laser processing system 100 according to a fourth embodiment will be described with reference to FIGS. 1 to 18. FIG. 18 is a schematic perspective view of the laser processing system 100 according to the fourth embodiment.

As illustrated in FIG. 18, the laser processing system 100 includes a workpiece support 110, the laser processor 1, a drive device 120, and a controller 130.

The workpiece support 110 supports the workpiece W to be processed by the laser beam. The workpiece support 110 includes, for example, a table on which the workpiece W can be secured.

The laser processor 1 includes the machining head 2, which radiates a laser beam toward the workpiece W. The laser processor 1 may be the laser processor 1A according to the first embodiment, the laser processor 1B according to the second embodiment, the laser processor 1C according to the third embodiment, or other laser processors.

The drive device 120 moves the machining head 2 relative to the workpiece support 110 (in other words, the workpiece W supported on the workpiece support 110). In the embodiment illustrated in FIG. 18, the drive device 120 is capable of moving the machining head 2 three-dimensionally. The drive device 120 may be capable of moving the machining head 2 in the direction of the X-axis, Y-axis, and Z-axis. In the embodiment illustrated in FIG. 18, the Z-axis is the direction parallel to the vertical direction, the X-axis is the direction parallel to the horizontal direction, and the Y-axis is the direction perpendicular to the X-axis and the Z-axis.

In the embodiment illustrated in FIG. 18, the drive device 120 includes a first frame 121, a first motor, which moves the first frame 121 relative to the workpiece support 110 in the direction of the X-axis, a second motor, which moves the machining head 2 relative to the first frame 121 in the direction of the Y-axis, and a third motor, which moves the machining head 2 relative to the first frame 121 in the direction of the Z-axis.

In the embodiment illustrated in FIG. 18, the drive device 120 moves the machining head 2 relative to the workpiece support 110. Alternatively, the drive device 120 may move the workpiece support 110 relative to the machining head 2. Further alternatively, the drive device 120 may move both the machining head 2 and the workpiece support 110.

The controller 130 has a wired or wireless connection to the drive device 120 to be able to transmit signals. The controller 130 controls the operation of the drive device 120 by transmitting control signals to the drive device 120.

Alternatively or additionally, the controller 130 may control the operation of the pressing member 30 described in the first embodiment, the second embodiment, or the third embodiment. For example, the controller 130 has a wired or wireless connection to the pressing member drive device 57 (refer to, for example, FIGS. 10 and 11) to be able to transmit signals and controls the operation of the pressing member 30 by transmitting control signals to the pressing member drive device 57.

Alternatively or additionally, the controller 130 may have a wired or wireless connection to a laser source 160 to be able to transmit signals. In this case, the controller 130 controls the operation of the laser source 160 by transmitting control signals to the laser source 160.

The laser processor 1 includes the laser source 160, an optical transmission member 170, the machining head 2, and the cartridge 6. The cartridge 6 includes the optical component 60, the first member 70, and the second member 80. Since the machining head 2 and the cartridge 6 have been described in the first embodiment, the second embodiment, or the third embodiment, the redundant descriptions of the machining head 2 and the cartridge 6 will be omitted.

The laser source 160 includes a laser oscillator. The laser oscillator may be any type of laser oscillator. The laser according to the embodiments may be a gas laser, a fiber laser, a semiconductor laser, a solid-state laser, or other types of lasers.

The optical transmission member 170 transmits a laser beam from the laser source 160 to the machining head 2. In the embodiment illustrated in FIG. 18, the optical transmission member 170 includes the optical fiber 170*f*. Alternatively or additionally, the optical transmission member 170 may include a mirror or other optical components.

In the laser processing system 100 according to the fourth embodiment, the cartridge 6 may be secured to the machining head 2 using the pressing force that the first member 70 receives from the pressing member 30. Additionally, the optical component 60 may be secured to the component of the cartridge 6 (more specifically, the first member 70 and the second member 80) using the pressing force that the first member 70 receives from the pressing member 30.

The two securing tasks described above may be performed using the controller 130 and the pressing member 30. For example, the controller 130 controls the operation of the pressing member 30 to cause the pressing member 30 to press the cartridge 6, so that the cartridge 6 is secured to the machining head 2, and the optical component 60 is also secured to the first member 70 and the second member 80 of the cartridge 6. Figures such as FIGS. 10, 11, and 12 illustrate the state after the cartridge 6 is secured to the machining head 2, and the optical component 60 is also secured to the first member 70 and the second member 80. The controller 130 controls the operation of the pressing member 30 by, for example, transmitting control signals to the pressing member drive device 57 (refer to, for example, FIGS. 10 and 11). In response to receiving the control signal from the controller 130, the pressing member drive device 57 drives the pressing member 30 so that the pressing member 30 presses the cartridge 6. Pressing the cartridge 6 with the pressing member 30 secures the cartridge 6 to the machining head 2 and also secures the optical component 60 to the first member 70 and the second member 80.

It should be clearly understood that the present invention is not limited to the above-described embodiments, and each of the embodiments or modifications may be deformed or modified as required within the range of the technical ideas obtainable from the present invention. Various techniques used in each of the embodiments or modifications may be applied to other embodiments or modifications unless a technical contradiction arises. Furthermore, any optional structure in each of the embodiments or modifications may be omitted as required.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A laser processor comprising:
a machining head having an optical path of a laser beam and comprising:
a pressing member; and
a stopper surface; and
a cartridge configured to be inserted in the machining head and configured to be pressed along the optical path toward the stopper surface by the pressing member when the cartridge is in the machining head, the cartridge comprising:
an optical component configured to be positioned in the optical path when the cartridge is in the machining head, the optical component having a first surface and a second surface opposite to the first surface along the optical path;
a first member having an upper surface and a lower surface opposite to the upper surface along the optical path, the first member being configured to contact the first surface of the optical component, the lower surface of the first member being configured to contact the pressing member; and
a second member configured to contact the second surface of the optical component and the stopper surface, an uppermost surface of the upper surface of the first member contacting the second member,
wherein the second member has an upper surface and a lower surface opposite to the upper surface along the optical path, and wherein a lowermost surface of the lower surface of the second member contacts the first member.

2. The laser processor according to claim 1, wherein the pressing member is configured to press the first member toward the stopper surface such that the first member presses the first surface of the optical component toward the stopper surface, and wherein the pressing member is configured to press the optical component to the second member via the first member such that the second surface of the optical component presses the second member to the stopper surface.

3. The laser processor according to claim 1, wherein the pressing member is configured to press the first surface of the optical component toward the stopper surface via the first member; and wherein the pressing member is configured to press the second member to the stopper surface via the second surface of the optical component.

4. The laser processor according to claim 1, wherein the pressing member is configured to press the cartridge to the stopper surface such that the cartridge is secured to the machining head and the optical component is secured to the first member and the second member between the first member and the second member.

5. The laser processor according to claim 1, wherein one of the first member and the second member includes a housing that accommodates at least part of the optical component, and wherein another one of the first member and the second member includes a pressing ring that contacts the optical component.

6. The laser processor according to claim 5, wherein at least part of the pressing ring includes a cantilever portion supported by the housing.

7. The laser processor according to claim 5, wherein a volume of the housing is greater than a volume of the pressing ring, and wherein a density of the housing is less than a density of the pressing ring.

8. The laser processor according to claim 5, wherein a minimum inner diameter of a section of the housing facing a side surface of the optical component is greater than a minimum inner diameter of a section of the pressing ring facing the side surface of the optical component.

9. The laser processor according to claim 5, wherein the cartridge further comprises a first sealing member disposed between the optical component and the housing, a second sealing member disposed on an upper surface of the pressing ring, and a third sealing member disposed on a lower surface of the housing.

10. The laser processor according to claim 1, wherein at least one of the first member and the second member has a depression that receives a distal end portion of a temperature sensor, and wherein the distal end portion of the temperature sensor faces the optical component.

11. A laser processing system comprising:

a workpiece support configured to support a workpiece to be processed by a laser beam;

a drive device;

a controller configured to control the drive device; and a laser processor comprising:

a machining head configured to radiate the laser beam toward the workpiece and configured to be moved by the drive device relative to the workpiece support;

a laser source;

an optical transmission member configured to transmit the laser beam from the laser source to the machining head;

the machining head having an optical path of the laser beam and comprising:

a pressing member; and a stopper surface; and a cartridge configured to be inserted in the machining head and configured to be pressed by the pressing member when the cartridge is in the machining head, the cartridge comprising:

an optical component disposed on the optical path when the cartridge is in the machining head, the optical component having a first surface and a second surface opposite to the first surface along the optical path;

a first member having an upper surface and a lower surface opposite to the upper surface along the optical path, the first member being configured to contact the first surface of the optical component, the lower surface of the first member being configured to contact the pressing member; and a second member configured to contact the second surface of the optical component and the stopper surface, an uppermost surface of the upper surface of the first member contacting the second member, wherein the second member has an upper surface and a lower surface opposite to the upper surface along the optical path, and wherein a lowermost surface of the lower surface of the second member contacts the first member.

12. The laser processing system according to claim 11, wherein the controller is configured to control operation of the pressing member to cause the pressing member to press the cartridge so as to make the cartridge secured to the machining head and make the optical component secured to the first member and the second member.

13. A method for mounting a cartridge on a laser processor having a machining head, comprising:

providing the cartridge which includes a first member, a second member, and an optical component which has a first surface and a second surface opposite to the first surface and which is provided between the first member and the second member such that the first surface and a second surface face the first member and the second member, respectively;

inserting the cartridge in the machining head having an optical path of a laser beam such that the optical component is positioned in the optical path, the first member having an upper surface and a lower surface opposite to the upper surface along the optical path; and pressing, using a pressing member, the first member toward a stopper surface of the machining head so that the first member presses the first surface of the optical component toward the stopper surface and so that the second surface of the optical component presses the second member to the stopper surface, wherein, during the pressing, the lower surface of the first member contacts the pressing member, and an uppermost surface of the upper surface of the first member contacts the second member, wherein the second member has an upper surface and a lower surface opposite to the upper surface along the optical path, and wherein, during the pressing, the upper surface of the second member contacts the stopper surface, and a lowermost surface of the lower surface of the second member contacts the first member.

14. The method for mounting the cartridge according to claim 13, wherein the pressing comprises compressing a first sealing member disposed between a housing and the optical component, one of the first member and the second member including a housing that accommodates at least part of the optical component, compressing a second sealing member disposed between a pressing ring and the stopper surface or the pressing member, another one of the first member and the second member including the pressing ring that contacts the optical component, and compressing a third sealing member disposed between the housing and the pressing member or the stopper surface.

15. The method for mounting the cartridge according to claim 13, wherein before the pressing, a gap exists between the first member and the second member, and wherein the gap is eliminated by the pressing.

16. The laser processor according to claim 1, wherein the upper surface of the second member is configured to contact the stopper surface.

17. The laser processing system according to claim 11, wherein the upper surface of the second member is configured to contact the stopper surface.

18. The method for mounting the cartridge according to claim 13, wherein the upper surface of the second member is configured to contact the stopper surface.

* * * * *